(12) United States Patent
Moore et al.

(10) Patent No.: US 7,000,012 B2
(45) Date of Patent: Feb. 14, 2006

(54) SYSTEMS AND METHODS FOR UNIQUELY IDENTIFYING NETWORKS BY CORRELATING EACH NETWORK NAME WITH THE APPLICATION PROGRAMMING INTERFACES OF TRANSPORT PROTOCOLS SUPPORTED BY THE NETWORK

(75) Inventors: Timothy M. Moore, Bellevue, WA (US); Vadim Eydelman, Redmond, WA (US); Jeffrey C. Venable, Sr., Union City, CA (US)

(73) Assignee: Microsoft Corporation, Redmond, WA (US)

(*) Notice: Subject to any disclaimer, the term of this patent is extended or adjusted under 35 U.S.C. 154(b) by 780 days.

(21) Appl. No.: 09/840,569

(22) Filed: Apr. 23, 2001

(65) Prior Publication Data

US 2002/0032780 A1    Mar. 14, 2002

Related U.S. Application Data

(63) Continuation-in-part of application No. 09/557,497, filed on Apr. 24, 2000, now abandoned.

(51) Int. Cl.
*G06F 15/177* (2006.01)

(52) U.S. Cl. .......................... 709/220; 709/224; 370/312

(58) Field of Classification Search ................ 709/220, 709/202, 224, 249, 250; 370/312; 345/441
See application file for complete search history.

(56) References Cited

U.S. PATENT DOCUMENTS

| | | | |
|---|---|---|---|
| 5,185,860 A | | 2/1993 | Wu |
| 5,570,366 A | * | 10/1996 | Baker et al. ............... 370/312 |
| 5,680,326 A | | 10/1997 | Russ et al. |
| 5,768,552 A | * | 6/1998 | Jacoby ...................... 345/441 |
| 5,787,252 A | * | 7/1998 | Schettler et al. ............ 709/224 |
| 5,845,081 A | * | 12/1998 | Rangarajan et al. ........ 709/224 |
| 5,917,997 A | | 6/1999 | Bell et al. |
| 5,948,055 A | * | 9/1999 | Pulsipher et al. ........... 709/202 |
| 5,991,771 A | | 11/1999 | Falls et al. |
| 6,092,121 A | | 7/2000 | Bennett et al. |
| 6,118,768 A | | 9/2000 | Bhatia et al. |
| 6,134,671 A | | 10/2000 | Commerford et al. |
| 6,138,159 A | | 10/2000 | Phaal |

(Continued)

FOREIGN PATENT DOCUMENTS

JP           2001059729           3/2001

OTHER PUBLICATIONS

Yavuz et al., *Highly Survivable Communications: Complementary Media Packet Switched Networks*, Communications Division SHAPE Technical Centre, 1993, pp. 1-1 to 1-14.

(Continued)

*Primary Examiner*—Wen-Tai Lin
(74) *Attorney, Agent, or Firm*—Wolf, Greenfield & Sacks, P.C.

(57) ABSTRACT

A service is disclosed that discovers information about the logical networks to which a computer is connected and provides that information to applications. The information is keyed to names constructed by the service. There is a mapping between the names and the logical networks. Applications may rely on the names when selecting a configuration to use with a given logical network. The network name may be correlated with other information, such as physical network interface(s) on the computer through which the logical network is accessible, application programming interfaces of the transport protocols supported by the logical network, and the connectivity type of the logical network. Applications are notified when network information provided to them changes or when new information becomes available.

1 Claim, 16 Drawing Sheets

U.S. PATENT DOCUMENTS

| | | | |
|---|---|---|---|
| 6,145,126 | A | 11/2000 | Matsukura et al. |
| 6,151,505 | A | 11/2000 | Larkins et al. |
| 6,209,089 | B1 | 3/2001 | Selitrennikoff et al. |
| 6,225,944 | B1 | 5/2001 | Hayes |
| 6,236,652 | B1 | 5/2001 | Preston et al. |
| 6,269,417 | B1 | 7/2001 | Mahalingam |
| 6,286,038 | B1 * | 9/2001 | Reichmeyer et al. ....... 709/220 |
| 6,295,455 | B1 | 9/2001 | Fischer et al. |
| 6,314,455 | B1 | 11/2001 | Cromer et al. |
| 6,353,854 | B1 | 3/2002 | Cromer et al. |
| 6,424,639 | B1 | 7/2002 | Lioy et al. |
| 6,473,407 | B1 | 10/2002 | Ditmer et al. |
| 6,477,576 | B1 | 11/2002 | Angwin et al. |
| 6,493,751 | B1 | 12/2002 | Tate et al. |
| 6,556,660 | B1 | 4/2003 | Li et al. |
| 6,560,650 | B1 | 5/2003 | Imai |
| 6,581,166 | B1 | 6/2003 | Hirst et al. |
| 6,587,970 | B1 | 7/2003 | Wang et al. |
| 6,615,276 | B1 | 9/2003 | Mastrianni et al. |
| 2002/0133573 | A1 * | 9/2002 | Matsuda et al. ............ 709/220 |
| 2002/0152311 | A1 | 10/2002 | Veltman et al. |
| 2002/0167919 | A1 | 11/2002 | Marples et al. |
| 2003/0083931 | A1 | 5/2003 | Lang |
| 2003/0110293 | A1 | 6/2003 | Friedman et al. |

OTHER PUBLICATIONS

Leonhardt et al., *Multi-Sensor Location Tracking*, MOBI-COM 98, 1998, pp. 203-213.

Maass, *Location-aware mobile applications based on directory services*, Mobile Networks and Applications, 1998, pp. 157-173.

Tamvaclis, *QOS Driven Routing in Packet Switched Networks of Multiple Transmission Media*, Shape Technical Centre, 1993, pp. 2-1 to 2-8.

*Specification of the Bluetooth System*, v. 1.0B, Dec. 1, 1999.

Riku Mettala et al., *Bluetooth Protocol Architecture* (White Paper), v1.0, Nokia Mobile Phones, Sep. 29, 1999.

Brent Miller et al., *Mapping Salutation Architecture APIs to Bluetooth Service Discovery Layer* (White Paper), v. 1.0, IBM Corporation, Jul. 1, 1999.

IEEE Standard, 802.11, *Part 11: Wireless LAN Medium Access Control (MAC) and Physical Layer (PHY) Specifications*, $1^{st}$ Ed. 1999, and Supplements 802.11a-1999 and 802.11b-1999.

Bob O'Hara and Al Petrick, *IEEE 802.11 Handbook A Designer's Companion*, Dec. 1999.

C. Rigney et al., RFC 2865, "Remote Authentication Dial in User Service (Radius)", The Internet Society, Jun. 2000.

B. Aboda and D. Simon, RFC 2716, "PPP EAP TLS Authentication Protocol", The Internet Society, Oct. 1999.

L. Blunk and J. Vollbrecht, RFC 2284, PPP Extensible Authentication Protocol (EAP), The Internet Society, Mar. 1998.

IEEE 802.11 *Security White paper*, v0.1, Windows Network Infrastructure team, Microsoft Corporation, Mar. 15, 2000.

T. Muller, *Bluetooth Security Architecture* (White Paper), v.1.0, Jul. 15, 1999.

IEEE 802.1X *Supported Scenarios*, Windows Network Infrastructure team, Microsoft Corporation, v0.1, Apr. 7, 2000.

* cited by examiner

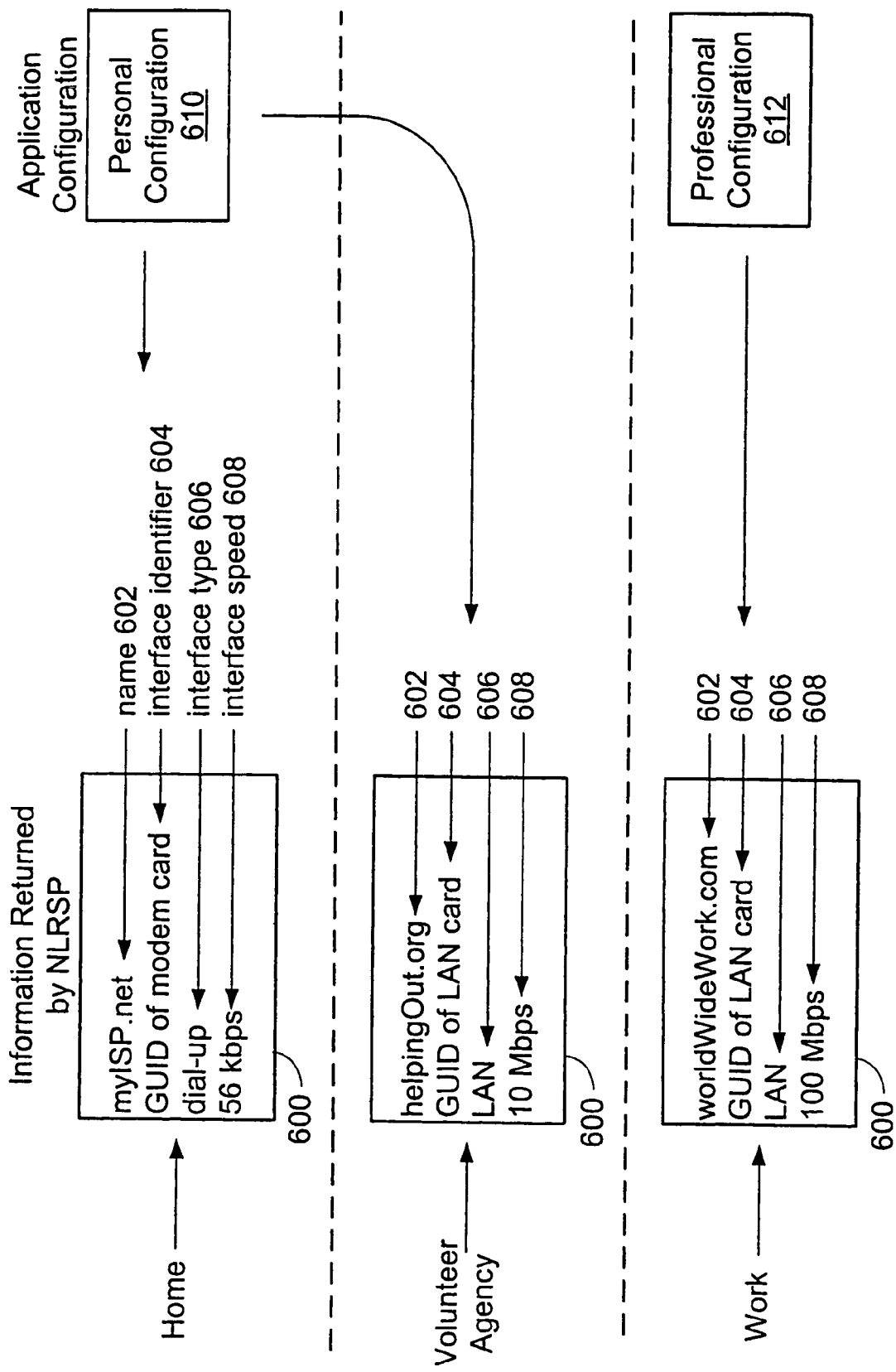

Information Returned by NLRSP home LAN
GUID of LAN card
LAN
10 Mbps

Information Returned by NLRSP home LAN
GUID of LAN card
LAN
10 Mbps
myISP.net
dial-up
56 kbps

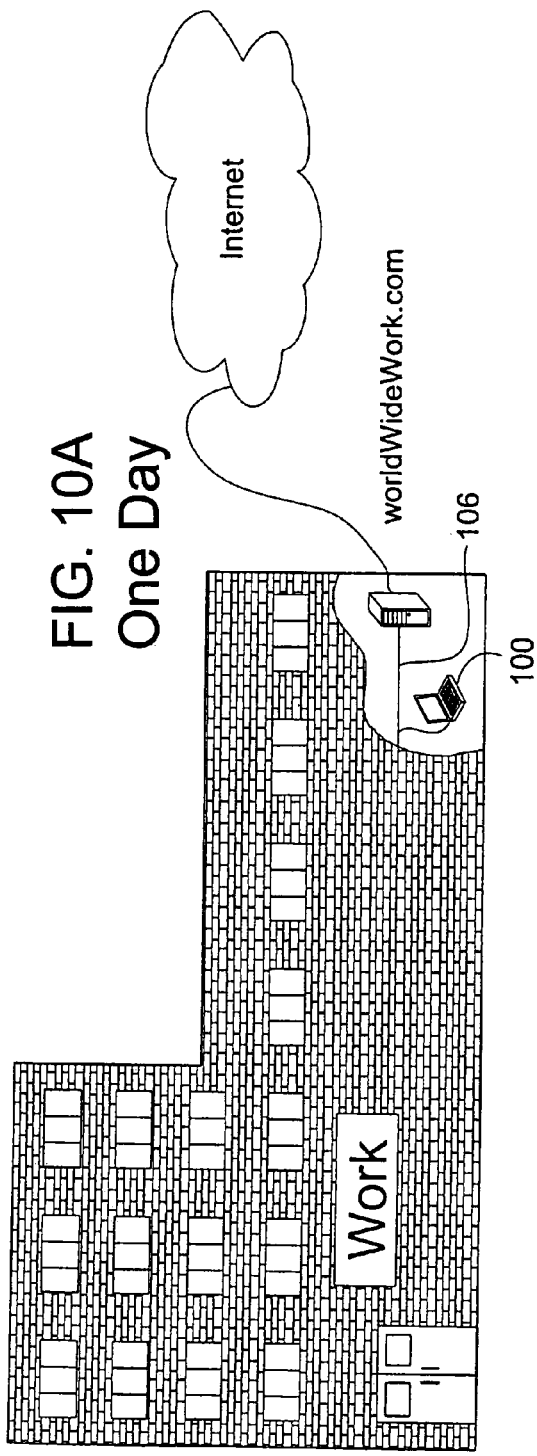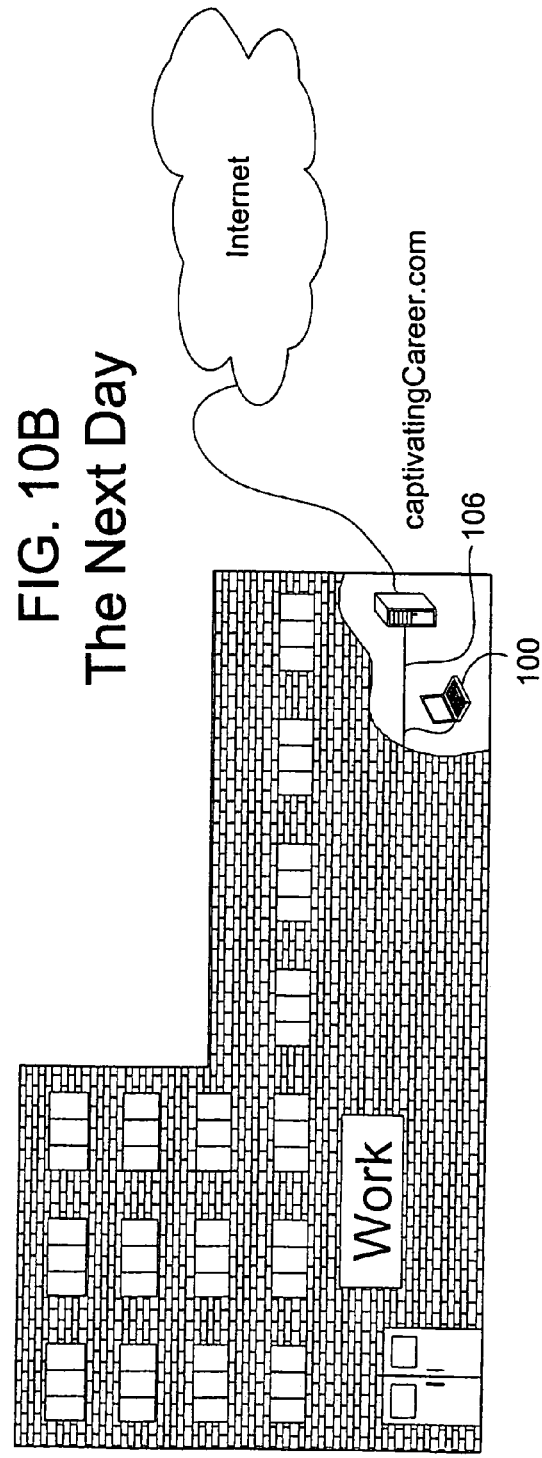

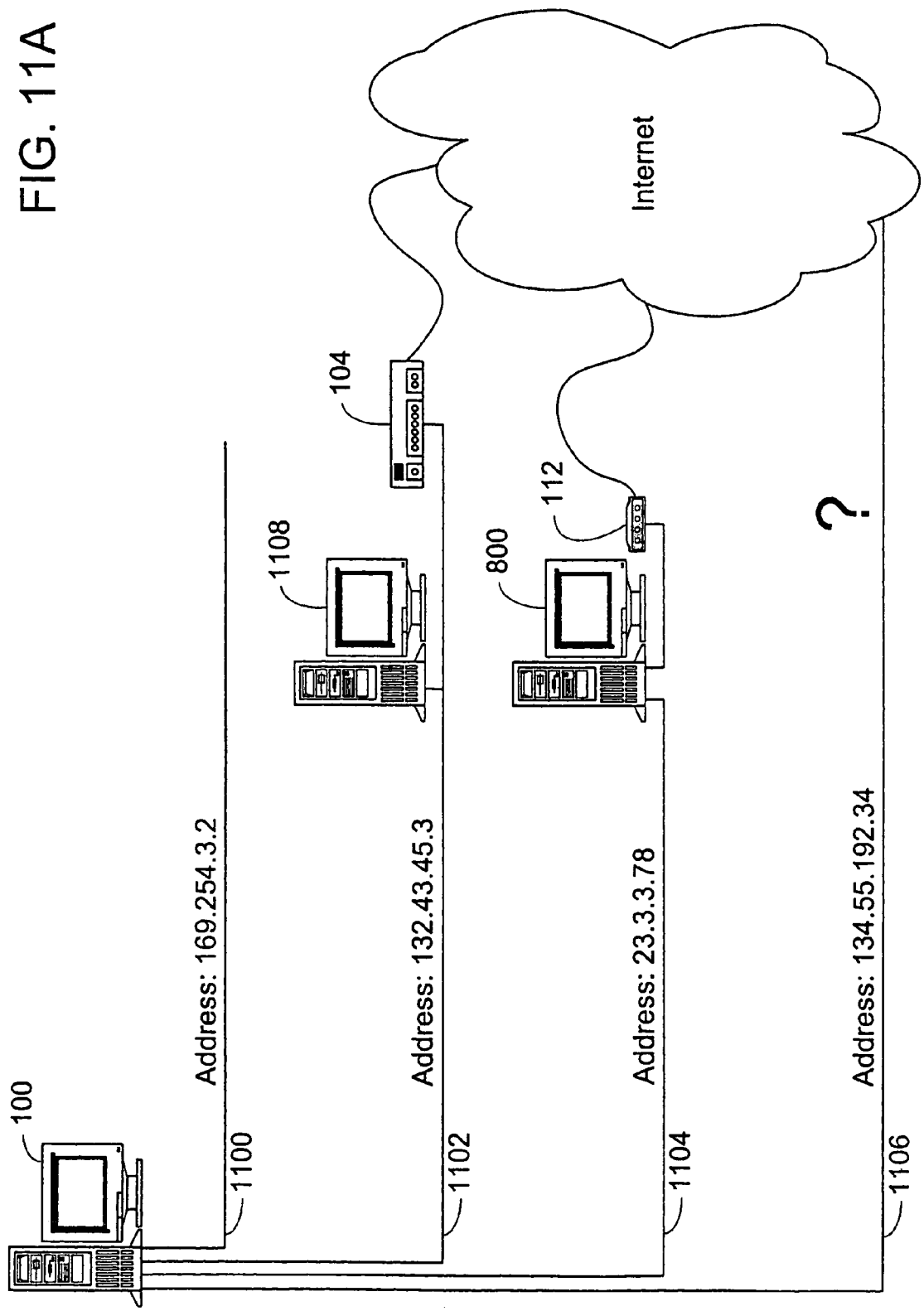

| Network | Network Connectivity Type | Internet Connectivity Available? |
|---|---|---|
| 1100 | Ad Hoc | No |
| 1102 | Managed | Yes |
| 1104 | Unmanaged | Yes |
| 1106 | Unknown | Yes |

FIG. 11D

SYSTEMS AND METHODS FOR UNIQUELY IDENTIFYING NETWORKS BY CORRELATING EACH NETWORK NAME WITH THE APPLICATION PROGRAMMING INTERFACES OF TRANSPORT PROTOCOLS SUPPORTED BY THE NETWORK

RELATED APPLICATION

This application is a continuation in part of application Ser. No. 09/557,497, filed on Apr. 24, 2000 now abandoned.

TECHNICAL FIELD

This invention relates generally to computer networks and, more specifically, to identifying the networks to which a computer is attached.

BACKGROUND OF THE INVENTION

Computers today connect to and disconnect from networks much more frequently than they did in the past. Laptops move around among one or more office networks and the home network. As a mobile computer with a radio network link passes from one radio access point to another, its network connection is, in effect, dropped and then reinstated.

Some computers can automatically sense when they are connected to a network and when that network connection changes. These computers are called "media sense aware." Media sense awareness is very useful in many common computing scenarios because computers, applications, and system services may want to alter their behavior depending upon the network to which the computer is connected. For example, when a non-media sense aware computer's link is disconnected from one network and connected to another, an application that transmits secure information may not realize the change and may inadvertently leak that secure information out onto the new network. Likewise, a non-media sense aware system service that obeyed the bandwidth reservation guarantees given by a Quality of Service manager on a previous network may inadvertently violate the bandwidth guarantees on the new network. Mobile computers are specially sensitive to problems if they are not media sense aware because of their frequent network disconnects and subsequent connects.

Some media sense aware computers, applications, and system services can only respond to network connect and disconnect events. U.S. patent application Ser. No. 09/652,501, "Systems and Methods for Resynchronization and Notification in Response to Network Media Events," filed on Aug. 31, 2000 now U.S. Pat. No. 6,782,422, expands on that basic functionality, allowing response to a broad range of network events. However, even when media sense aware applications and services know about a change in the status of their network connections, they may not have enough information to know how to respond, unless a user manually reconfigures them for their changed circumstances. The applications and services may be able to enumerate the network interfaces available on a computer but do not know to which logical network an interface connects nor whether multiple interfaces connect to the same network. This information is often needed, however, when the applications and services attempt to select an optimal configuration to use with the new network connectivity. They are left having to discover network information themselves before they can respond appropriately. The problem is especially acute for mobile computers that frequently move among different networks and for computers for which more than one network connection is available, such as multi-homed computers that may support both a LAN connection and a dial-out link.

Forcing each application and system service to discover network connectivity information creates further problems because there are multiple ways in which logical network connections may be determined, depending upon the types of the connections.

SUMMARY OF THE INVENTION

The above problems and shortcomings, and others, are addressed by the present invention, which can be understood by referring to the specification, drawings, and claims. The present invention discovers information about the logical networks to which a computer is connected. The information is provided to applications running on the computer, the information keyed to names constructed by the invention. There is a "one-to-one" mapping between the names and the logical networks. This one-to-one mapping has two fundamental properties. First, different logical networks are given different names. Second, a given logical network is given the same name whenever the computer connects to it. These properties are called "uniqueness" and "persistence," respectively. Because the network names are unique and persistent, applications may rely on them when selecting a configuration to use with a given logical network. Even though some embodiments of the invention may, in certain circumstances, produce mappings that are not strictly unique or persistent, the information they produce may still be valuable in selecting a configuration.

According to another aspect of the present invention, the network name is correlated with other information, such as physical network interface(s) on the computer through which the logical network is accessible, application programming interfaces of the transport protocols supported by the logical network, and the connectivity type of the logical network. Applications are notified when network information provided to them changes or when new information becomes available.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6B shows, for each of the three locations of FIG. 6A, the network information provided and the configuration a particular application may choose when connected to a logical network at that location;

FIGS. 10A and 10B present a situation in which some embodiments of the invention may return different names for the same network;

FIG. 11A is a network diagram showing a computing device connected to four different types of networks;

FIG. 11D is a block diagram showing network connectivity type and Internet connectivity information for the four networks of FIG. 11A.

DETAILED DESCRIPTION OF THE INVENTION

Figure 1:
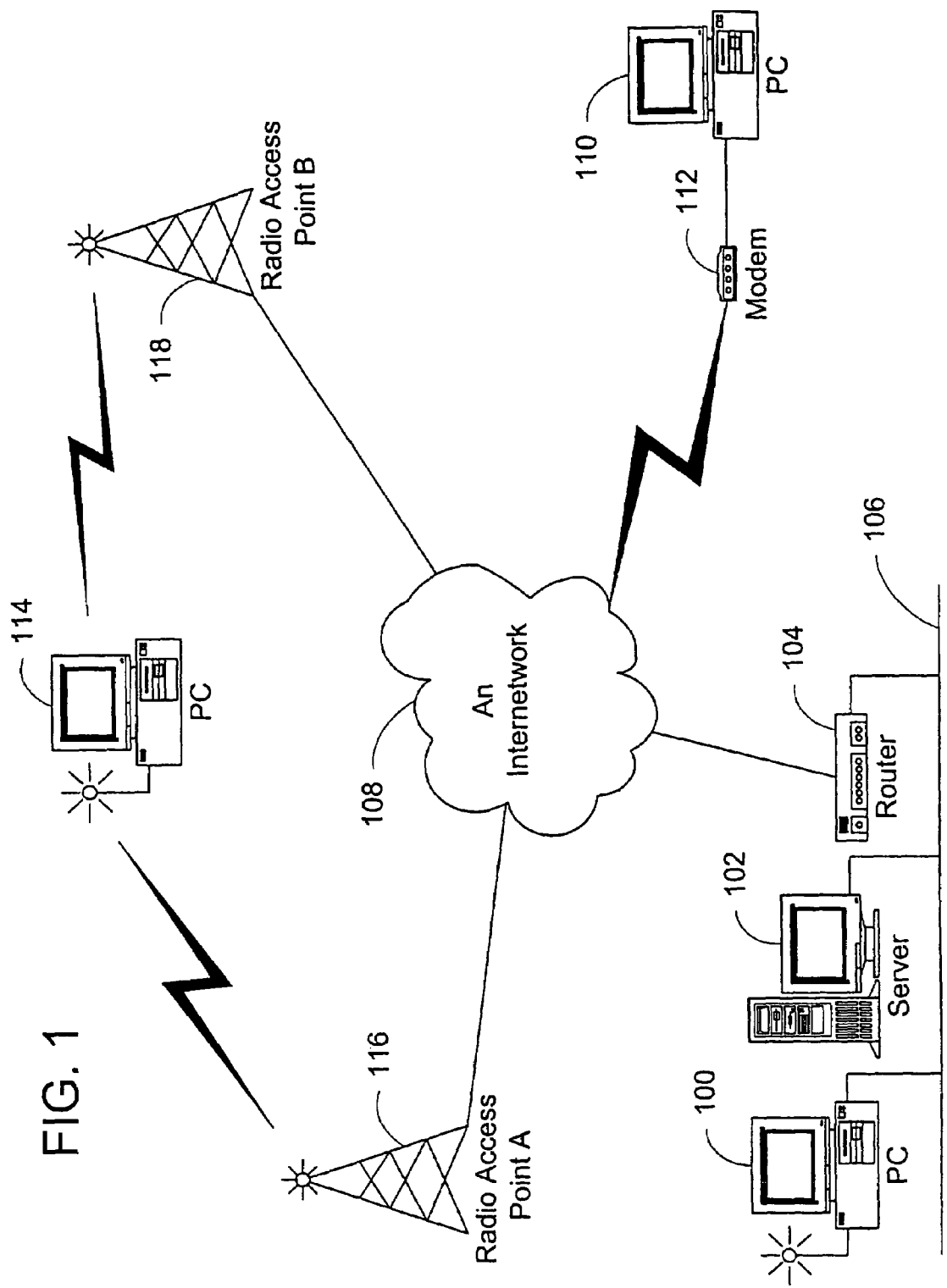
FIG. 1 shows a community of computer systems connected by multiple networks.

Turning to the drawings, wherein like reference numerals refer to like elements, the invention is illustrated as being implemented in a suitable computing environment. The following description is based on exemplary embodiments of the invention and should not be taken as limiting the invention in any way. Sections I through IV describe media sense awareness and notifications of changes in network connectivity. These sections are based on U.S. patent application Ser. No. 09/652,501, "Systems and Methods for Resynchronization and Notification in Response to Network Media Events." Sections V and VI build on the previous sections, describing aspects of the present invention as a service that identifies the logical networks to which a computer is attached.

In the description that follows, the invention is described with reference to acts and symbolic representations of operations that are performed by one or more computers, unless indicated otherwise. As such, it is understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

I. Sensing Network Media Events

Sections following this one discuss how computer systems may respond when they sense network media events. This section provides information about the events themselves.

In FIG. 1, several computer systems with different communications mechanisms are configured to communicate with one another. While FIG. 1 shows all of the computing devices as resembling general-purpose computers, they may in practice range from multiprocessor mainframes to personal digital assistants, telephones, set top boxes for televisions, etc. A LAN 106 connects a first computing device 100, a server 102, and a router 104. The router also has a communications link to an internetwork 108 which may be a corporate intranet or the Internet. A second computing device 110 connects to the internetwork 108 by way of a dial-up modem 112 and telephone line. A third computing device 114 uses wireless technology to communicate. The wireless technology may be, for example, infrared or optical, but this example portrays a radio connection. Two radio access points (RAPs), 116 and 118, are connected to the internetwork 108 and may enable the third computing device 114 to communicate with the other computing devices connected to the internetwork. The first computing device 100 can also communicate via wireless means, in addition to using the LAN 106.

Figure 2:
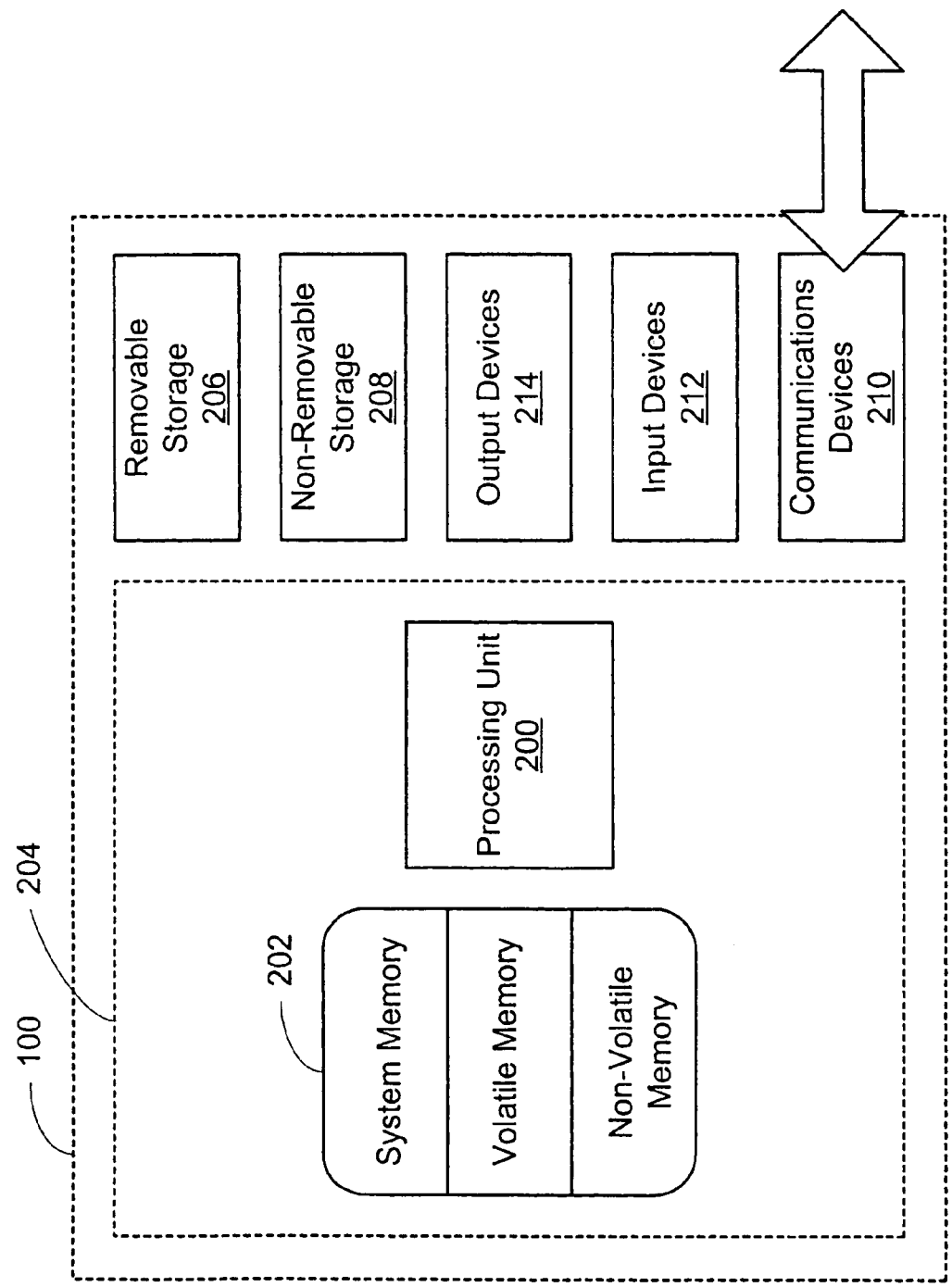
FIG. 2 is a block diagram generally illustrating an exemplary computer system that supports the present invention.

FIG. 2 is a block diagram generally illustrating an exemplary computer system that supports the present invention. The computing device 100 is only one example of a suitable environment and is not intended to suggest any limitation as to the scope of use or functionality of the invention. Neither should the computing device 100 be interpreted as having any dependency or requirement relating to any one or combination of components illustrated in FIG. 2. The invention is operational with numerous other general-purpose or special-purpose computing environments or configurations. Examples of well-known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, computing device 100 typically includes at least one processing unit 200 and memory 202. The memory 202 may be volatile (such as RAM), non-volatile (such as ROM, flash memory, etc.), or some combination of the two. This most basic configuration is illustrated in FIG. 2 by the dashed line 204. The computing device may have additional features and functionality. For example, computing device 100 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media which can be used to store the desired information and which can accessed by computing device 100. Any such computer storage media may be part of the computing device. The device 100 may also contain communications connections 210 that allow the device to communicate with other devices. Communications connections 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks (including the LAN 106 of FIG. 1) and direct-wired connections, and wireless media such as acoustic, RF, infrared, and other wireless media. The term computer-readable media as used herein includes both storage media and communications media. The computing device 100 may also have input devices 212 such as a keyboard, mouse, pen, voice-input device, touch-input device, etc. Output devices 214 such as a display, speakers, printer, etc., may also be included. All these devices are well know in the art and need not be discussed at length here.

Network logic within a computing device constantly monitors the characteristics of the physical medium that links the device to a network. Very generally, when that logic senses a change in the medium's characteristics, the logic reacts, possibly changing the way the device connects to the network. Also, the network logic informs applications running on the device of the change so that they may react appropriately. The following examples of network media events will aid in understanding the teachings of the present invention. Sections following this one describe in detail responses to the sensed change, both from the network logic and from the applications.

In a first example, assume that the computing device 100 is monitoring its link to the LAN 106 for the most fundamental of network media events: a media disconnect. In a media disconnect event, all incoming and outgoing traffic fails on the link. The manner in which a disconnect event is sensed may vary with the type of link. On some links, the computing device may sense the disconnect immediately while in others, the computing device may not know until a certain amount of time passes without detectable activity on the link. In any case, the response is usually the same with the computing device first attempting to reconnect to the network over the link. Failing that, the computing device might attempt to communicate over another link. This particular computing device may try the latter strategy because it has a radio transmitter. With the LAN inaccessible, the computing device may be able to reroute its traffic to RAP A 116 and then on to the other devices.

The complement of a media disconnect event is a media connect event. The computing device 100 may note that its connection to the LAN 106 is now working again. If that connection is faster or cheaper than the computing device's radio link, the computing device 100 may reroute its traffic off the radio link and back onto the LAN. In one embodiment of the present invention, the computing device 100 keeps track of how long the link was disconnected. If the disconnect period was very short, then the computing device proceeds to use the link as if nothing happened. For longer disconnects, however, procedures running on the computing device or on other devices may have timed out. In such a situation, the computing device needs to reestablish the network link as if it were connecting for the first time. Devices that are not always connected to a network, such as the computing device 110 that dials in, must go through this new connection routine whenever they access a network. To complicate matters, the computing device cannot always assume that the network to which it is now connected is the same network to which it was connected before the media disconnect event. In one embodiment of the present invention, the computing device performs some type of discovery to learn the nature of the newly connected network.

Wireless complicates these simple scenarios of media disconnect and connect events. Assume that the computing device 114 is using its transmitter to access devices via RAP A 116. Assume also that the computing device 114 is moving away from RAP A toward RAP B 118. While moving, the computing device monitors the strength of the signals coming from the two RAPs. The strength of RAP A's signal could suddenly go to zero which would be analogous to the LAN media disconnect event discussed above, but it is much more likely that the signal will gradually fade. Sensing the fade, the computing device may try to connect to RAP B even while the signal from RAP A is still tolerable. Thus, a wireless link is susceptible to more than simple media disconnect and connect events because the wireless link is not just "up" or "down" but may be "better" or "worse" or "mostly the same" as one or more other available links. A wireless computing device may need to closely monitor all available links in order to make intelligent transmission choices.

This radio scenario hints at more complications of wireless communications. A wired device usually knows how many connections it can have: at most, one per network interface. A wireless device, on the other hand, has a potential connection to each access point whose signal strength is above a given threshold and these access points may appear and disappear unpredictably. This exacerbates the problem mentioned above in relation to wired networks: a connect following a disconnect need not be to the same network. In one embodiment of the invention, wireless links are checked to see to what they are connecting.

Going beyond media disconnect and connect events, network logic may detect a change in the error rate of data transmitted over the link. This may be due to link degradation, such as when a standard telephone line gets wet, when a radio access point moves farther away, or when a radio link suffers from increased interference. The increased error rate may also be caused by a defective network interface card connected to the network, or may simply be a result of increased traffic loads on the network. If the detected error rate exceeds a certain amount, then the network logic may look to use another network link, even though the current link is not in any sense disconnected.

The effective data rate that a computing device gets from a network link may decrease, independently of any increase in the error rate on the link. This may be due to increased use by others of a shared link or by link logic changing the link's transmission characteristics to accommodate changes in its operating environment. The response could well be the same as for an increased error rate: the network logic could search for another link.

Devices may want to respond to changing conditions before they result in actual errors. For example, network logic may sense that the response time on a network link is increasing substantially, although it is still within the parameters formally defined as acceptable for this type of network link. By definition, this is not an error condition, but the network logic may still use this information in considering whether to send traffic by a different route.

Other types of media events can be sensed including a change in the latency experienced by packets traversing the network, a change in the variation in latency (jitter), a change in the maximum packet size allowed on the network, etc. Responses can be developed for many of these events.

The above examples begin to show the richness of the information available to a device that is critically aware of the state of its network media. The following sections build on this richness to show some of things that can be done with this information.

II. An Implementation of the Network Logic

Figure 3:
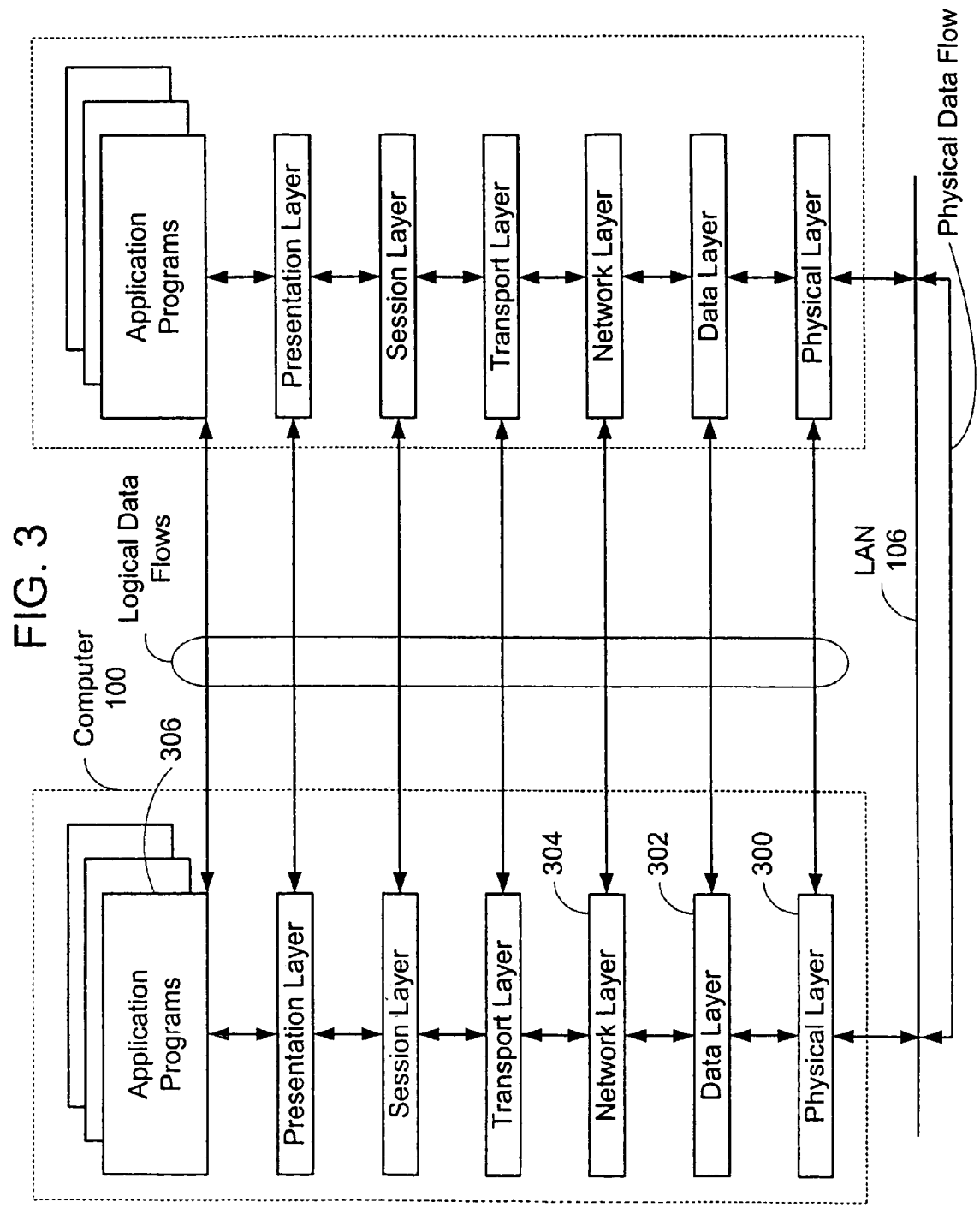
FIG. 3 presents the International Standards Organization Open Systems Interconnection (ISO/OSI) model for hierarchically-layered network communications protocols.

Before detailing how the network logic responds to network media events that it senses, it may help to have in mind one particular embodiment of that network logic. On each computing device in FIG. 1, network logic implements the communications protocols used. Many, but not quite all, of today's communications protocols follow the International Standards Organization Open Systems Interconnection (ISO/OSI) protocol model shown in FIG. 3. In this model, the overall task of enabling network communications is divided into subtasks and those subtasks are each assigned to a logical layer in the protocol stack. The stack is hierarchical: each layer has a defined interface with the layers above and below it. Logically, each layer communicates with its peer layer on another computer, provides services to the layer above it in the stack, and uses the services provided by the layer below it. Physically, data flow down the stack from their originator until the physical layer 300 actually transmits them across the medium of the network connection, shown here as a LAN 106. When the data are received by the target computer, they are passed up the stack with each layer stripping off and responding to the data meant for it while passing the rest of the data up to the next level. For example, the network layer 304 defines how data are routed among networks. The network layer on one computer logically speaks with the network layer on another computer by passing a packet of data down to the data layer 302 on its own computer. The data layer in turn adds a header to the network layer's packet thus creating a data frame which it passes to the physical layer. The physical layer uses the physical network medium to transmit that data frame. When the data frame is received by the target computer, the target's data layer reads the data frame, stripping from it the header information meant for its own use. Then the data layer takes the rest of the frame, consisting of the originator's data packet, and sends it up to the network layer. Thus, the network layer on the target reads the data as sent by the network layer on the originator without having to decode the data layer header and other information used by the lower layers to transmit the data packet.

The primary advantage of this scheme is that application programs 306 can communicate with each other without concerning themselves with the myriad details of establishing and maintaining a network connection. Protocol layers find the remote application programs with which the originating application program wishes to speak, retransmit information damaged during transmission, ensure that information is received in order, reroute information when communications links fail, and do all the other tasks necessary to present as flawless as possible a connection to the application programs.

It should be remembered that the ISO/OSI protocol stack is a conceptual model only and that no protocol follows it exactly. However, many popular protocols in use today follow this model to a greater or lesser extent and the model makes discussion of the communications tasks it defines more easily comprehendible.

Figure 4A:
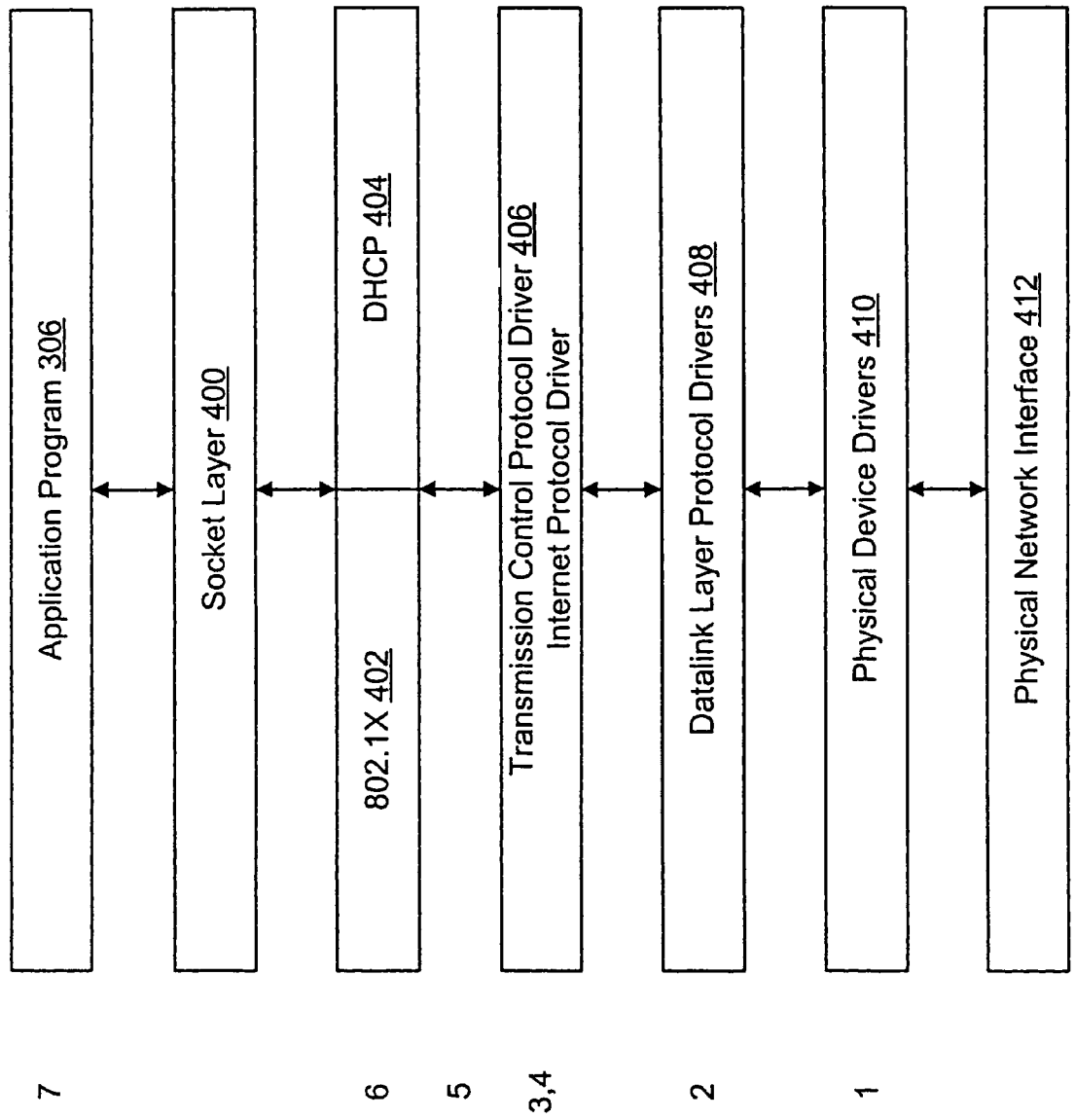
FIG. 4A is a block diagram showing some of the functions involved in running a hierarchically-layered network communications protocol on a computer system.

The ISO/OSI model does not, however, specify how a computing device 100 should internally implement the tasks required to support an ISO/OSI layered communications protocol. FIG. 4A shows one possible implementation of a computing device supporting the popular Transmission Control Protocol/Internet Protocol (TCP/IP) stack. In this embodiment, but not necessarily in all embodiments, communications flow up and down a stack of computing components that is closely analogous to the layered stack in the ISO/OSI model. Network communications services are presented to the application program 306 by the socket layer 400. The socket layer insulates the application program from the details of the ISO/OSI communications protocol. This insulation is especially valuable when a computing device is connected to more than one network and running more than one communications protocol. (For an example of this, see FIG. 4B.) When the application program calls a routine in the socket layer to send data to an application program on another computing device, the request works its way down the stack of protocol components with each component communicating with its peer on the other computing device as per the ISO/OSI model. Even in this embodiment, however, some components do not map directly to ISO/OSI layers. Some protocols do not implement all of the ISO/OSI layers, as shown here by the lack of a specific layer 5 (Session Layer) component. An implementation may also combine the functionality of several ISO/OSI layers into one component. In FIG. 4A, layers 3 (Network Layer) and 4 (Transport Layer) are supported by a combined TCP/IP driver 406. A complicated protocol such as TCP/IP requires functions beyond the simple transport of data. In FIG. 4A, these functions are represented by the 802.1X component 402, which provides authentication services, and by the dynamic host configuration protocol (DHCP) service 404, which provides for non-static network addresses.

Figure 4B:
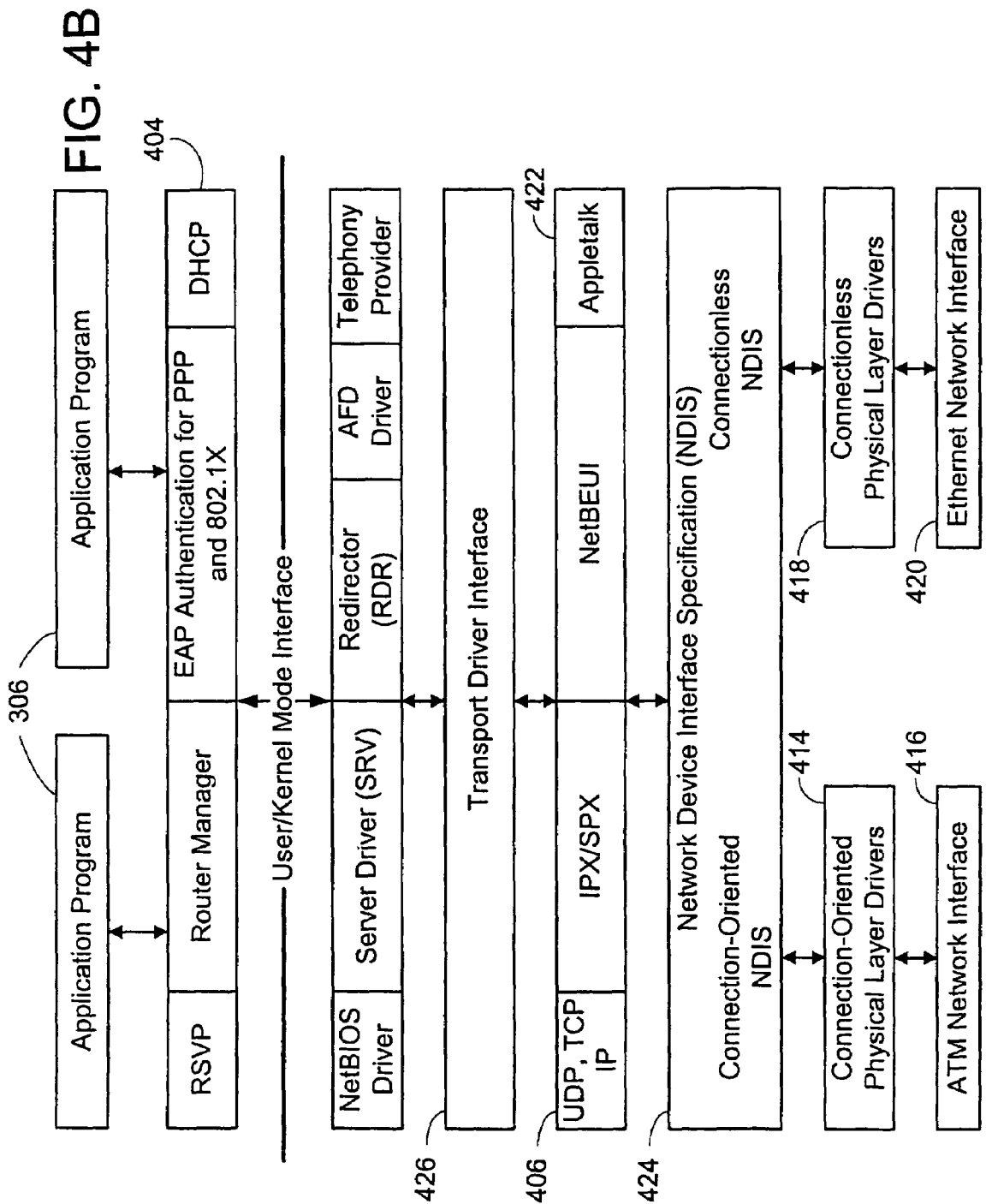
FIG. 4B is a block diagram presenting one possible implementation of the functions described with respect to FIG. 4A.

FIG. 4B is a more specific version of FIG. 4A and illustrates an embodiment of network communications tasks within Microsoft's "WINDOWS" operating system. This embodiment is useful for illustrating how the network logic responds to sensed media events, as described in the next section. For the moment, note that there is often more than one communications task at a given layer. ISO/OSI's physical layer 300 is divided in this implementation between connection-oriented physical layer drivers 414, such as for the Asynchronous Transfer Mode 416, and connectionless physical layer drivers 418, such as for Ethernet 420. Again, one computer may simultaneously implement two sets of ISO/OSI levels 3 and 4, once as TCP running over IP 406, and once as the Appletalk protocol 422. This redundancy gives to the network logic the flexibility to reroute information from one protocol stack to another when it senses a disruption in the service provided by one of the stacks.

III. Actions of the Network Logic in Response to Network Media Events

According to one embodiment of the present invention, having sensed one of the several types of network media events discussed above, the network logic analyzes that event and responds in a manner calculated to best preserve effective communications. The response varies not only with the event, but with the existing communications environment, with the computing device on which the network logic is running, and with the specific implementation of the network logic. This section details responses to some events, taking examples from one possible implementation of the network logic. For purposes of illustration, the computing device is taken to be the general-purpose computer 100 of FIG. 1, connected to a TCP/IP network 106. In general, however, the computing device may be any device connected to any communications link, such as a networked printer or even a telephone, etc.

On a Media Disconnect Event

In a preferred embodiment, when a physical layer driver (418 in FIG. 4B) detects that its network media has been disconnected, it passes a notification of the event up the protocol stack to the Network Device Interface Specification (NDIS) 424. NDIS uses the IPStatus callback function to pass the notification to the TCP/IP driver 406.

At this point, the TCP/IP driver 406 may choose to wait for a short time and then query the lower protocol levels for the status of the network connection media. If the problem has been cleared up, then the TCP/IP driver need do nothing more. This strategy smoothes out transient problems without having to inform the application programs 306.

If a computing device is equipped with more than one network interface (as is the case, for example, with the first computing device 100 in FIG. 1), then the network logic attempts to reroute traffic intended for the failed network interface 420 to another network interface. In one embodiment of the present invention, this reroute is done entirely within the protocol stack, transparently to the application programs 306. Note, however, that even if traffic can be rerouted, the TCP/IP driver 406 may choose to remove the address (or mark it unusable) and give an "IP address deletion" notification. This allows media sense aware applications to synchronize to the new state, if necessary. For example, routing software can respond to an immediate notification of a media disconnect or connect event. The routing software can then use its routing protocol to tell other routers about the event.

If a second network interface is available, the network logic may need to perform one or more of the following operations, in addition to rerouting traffic.

Automatic Virtual Private Network Failover. If a tunnel to a server was set up over the failed network interface 420, a new tunnel may be set up over the second network interface. Even if no tunnel was set up on the failed network interface, a new tunnel may have to be set up if the second network interface connects to a network different from that of the failed network interface. In either case, tunnel setup requires more than a simple change to the routing table. The tunneling client software must run the tunnel setup logic with the same (if accessible and preferable) or with another tunnel server. The tunneling client software may be configured with the name or address of the other tunnel server, or it may query the Domain Name System (DNS) over the second network interface.

Automatic Address Failover. If the second network interface connects to the same network as did the failed network interface 420, then the second interface can move from being passive (connected to the network but with no address) to being active by taking over the address of the failed network interface. Even if the second interface was active before the failure, it can still take the address of the failed interface. This makes the disconnect event transparent to the end stations communicating with this computing device via the failed-over TCP/IP address.

Binding Update. The computing device 100 can send an IPv6 binding update message to tell a remote computer 110 that the TCP/IP address associated with the TCP connect message is now connected to the second IP address rather than to the failed address.

If the problem persists and traffic cannot be transparently rerouted, then the TCP/IP driver 406 removes the TCP/IP address associated with the failed network interface 420 and passes an "IP address deletion" notification up the stack. Application programs 306 receive that notification through the Transport Driver Interface 426, IPHLPAPI callbacks, the Winsock API (Application Program Interface), or Microsoft's Windows Management Instrumentation. The notification allows users of the TCP/IP protocol stack to operate in the "network unreachable" mode.

The next section describes other responses taken by application programs when they receive this notification.

On a Media Connect Event

Notice of the event is passed up the stack, just as in the case of a media disconnect event, described immediately above. The TCP/IP driver 406 passes the notice up to the DHCP service 404. The DHCP service requests either a DHCP renew or a DHCP discover, the choice depending on whether the service has a non-expired or an expired lease at the time of the media connect event. The TCP/IP driver gets an IP address and other network configuration information (which may either be a renewal of the configuration existing prior to a media disconnect event or may be new). The TCP/IP driver then passes up the stack a "something changed" notification. Higher-level protocol drivers respond to this notification by tuning their behavior to use the new network connection in the most optimal manner possible. Some application programs 306 may not recognize the notification; they might have to be restarted to ensure that they use the new network configuration.

If the computing device 100 were disconnected from one network and then connected to another, its DHCP renew or discover request would be answered with a NACK from the new network's DHCP server. The computing device then gets a new address and configuration from the new network's DHCP server.

If the computing device has a statically configured address, then there is normally no need for a DHCP renewal or discovery. The static address is simply replumbed to make the protocol stack operational on the newly connected network interface. However, an Address Request Protocol message is sent to detect whether the static address is a duplicate of an address already in use. In the case of a disconnect from one network followed by a connect to another, the computing device can discover to which network it is connected by sending a DHCP discover. If the computing device determines that it is on a different network from the one for which it is configured, it can decide to stay in the disconnected state, go into the auto-net state in order to gain connectivity to other auto-net machines, or simply take the returned DHCP address if the DHCP server is available. A stored policy can tell the computing device which action to take in this situation.

Once the computing device has discovered and plumbed its new network configuration, it can proceed to do the following. The computing device rejoins the IP multicast groups it was in before the media disconnect event. There are two types of groups to be joined—permanent and temporary. The "all hosts multicast" and "all routers multicast" groups are examples of permanent groups that all hosts and all routers, respectively, must join. Temporary groups are those that a computing device joins as a result of a request from an application program. On a media connect event, the computing device automatically joins the permanent groups when the protocol stack is initialized as part of the address plumbing. Media sense aware application programs can then request that the computing device rejoin its temporary groups.

If IPsec policies were in effect on the computing device, then they should be plumbed correctly. For example, the IPsec policy:

from/to me to/from <IP addresses or wild card>, use 3DES encryption and MD5 authentication should be plumbed. Note that if the IP address changes as a result of the media connect event, "me" in this IPsec policy would expand to the new IP address. This ensures that no information leaks as a result of the change from the former network to the new.

If a quality of service policy of the type:

from me to <IP address>, use xx bits/second were in effect on the computing device, then the computing device sends RSVP requests for service guarantees of bandwidth on the network and on the destination. This is done even if the computing device were disconnected and then connected back to the same network because the state kept by network elements such as routers may have timed out between the two media events.

If the computing device is "ICMP router discovery enabled," then it sends router discovery requests in order to discover the routers on the network. Similarly, the computing device discovers if other servers and services are available on the new network.

On a Change in Carrier Strength Event

As discussed above, a wireless computing device 114 moving away from one RAP 116 toward another RAP 118 will probably experience a degradation in the signal strength of the former RAP while the strength of the latter's signal increases. The computing device need not wait for an actual media disconnect on the RAP it is using but can anticipate it and respond by scanning for other RAPs. Upon notification of a change in signal strength, the computing device decides whether it is appropriate to connect to a new RAP. If so, it makes the connection and triggers a media connect event specifying the new RAP. Higher-level protocol drivers and applications are notified that the connection was not lost but may have changed. In addition, the following actions are taken:

On choosing to connect to a new RAP (a virtual media connect event), the computing device sends three Extensible Authentication Protocol (EAP) start authentication messages to the new RAP to determine whether it supports authentication, such as by use of the IEEE 802.1X protocol. If so, then the computing device completes the authentication process, else it assumes that it is connected to an unauthenticated network.

Once the computing device is authenticated (or decides it is on an unauthenticated network), it starts the DHCP protocol to get its address and network configuration. Subsequent steps are the same as explained above for real media connect events.

On Other Network Media Events

Other network media events described above in the section entitled "Sensing Network Media Events" include a change in the error rate on the communications link, a change in the effective throughput on the link, and a change in the response time of some other device on the network. The same principles described above can be used to enable the network logic to respond to these other network media events.

IV. Actions of Applications upon Notification that Something Changed

As described above, sometimes the network logic can respond to a network media event in such a manner that the application programs need never know of the event. More generally, however, the application programs are informed that something changed so that they may try to alter their operations in response to the changed circumstances caused by the event.

On a Network Changed Event

This is a "generic" event, indicating that something has changed but not saying what. Upon receiving notification of this event, the application enquires to determine what has changed. The most common possibilities are described below.

Media Disconnect

An application program may choose to close down if it cannot operate without network access. On the other hand, some application programs may continue to perform as best as they can while waiting to take advantage of a possible reconnect event in the near future. These applications inform their users of the problem and, if the original network connection cannot be reestablished, they remain ready to take advantage of a new network connection if one becomes available.

Some application programs may not recognize the notification of a media disconnect and so cannot immediately respond to the new circumstances. However, as soon as they attempt an operation on the failed network connection, they will receive a "network disconnected or unreachable" error and can then respond appropriately.

Media Connect

If there were no working network connections before this event, then the application program changes its state from "network unreachable" to "network initializing" and goes through network initialization. This involves re-registering names and multicast groups on the new network.

Because applications vary widely in purpose one from another, they also vary widely in how they respond to changes in network connectivity. Some specific examples are given below.

An Internet browser application may query the new network configuration received from the DHCP server to see if the network contains a proxy server. If so, the browser can set itself up to use the proxy server.

The DNS Resolver service caches DNS server addresses so it is important that it notes any changes in those addresses. The new network configuration received from the DHCP server has this information.

The NetBIOS client notes changes to the WINS server addresses (also found in the new network's DHCP configuration) and uses those new WINS servers for NetBIOS name registrations, releases, and queries.

The printer service notes changes to the printer addresses (also found in the new network's DHCP configuration) and uses the new printers for servicing print requests.

An application program that receives a multicast stream via the Scalable Reliable Multicast mechanism may check to see if the available bandwidth on the new network connection is lower than it was on the previous network connection. If so, the application may inform the sending application so that it can throttle the send rate and thus avoid data loss within the network and subsequent retransmissions. In a like manner, an application sending a multicast stream may check the availability of bandwidth on the new network connection and adjust its send rate accordingly.

While the computing device was not connected to the network, a logon service may have granted access to a user on the basis of cached credentials. On reestablishing the network connection, the logon service can query a security server for the logon credentials.

V. The NLRSP: Providing Network Connectivity Information

The section immediately preceding this one gives examples of applications' responses to network media connect events. Because applications may need to adapt their behavior to the nature of the logical networks to which their host computer is attached, the applications seek to discover the nature of a newly connected network by communicating with devices on that network. Complications arise because networks differ in the set of discovery techniques applicable to them. Accordingly, one aspect of the present invention removes the burden of supporting all of the various discovery techniques from the applications. In accordance with the present invention, a set of services, for the sake of discussion called the Network Location Resolution Service Provider (NLRSP), is provided by the host computer to discover aspects of the new network connections. The discovered information is provided to applications through a common API.

Figure 5:
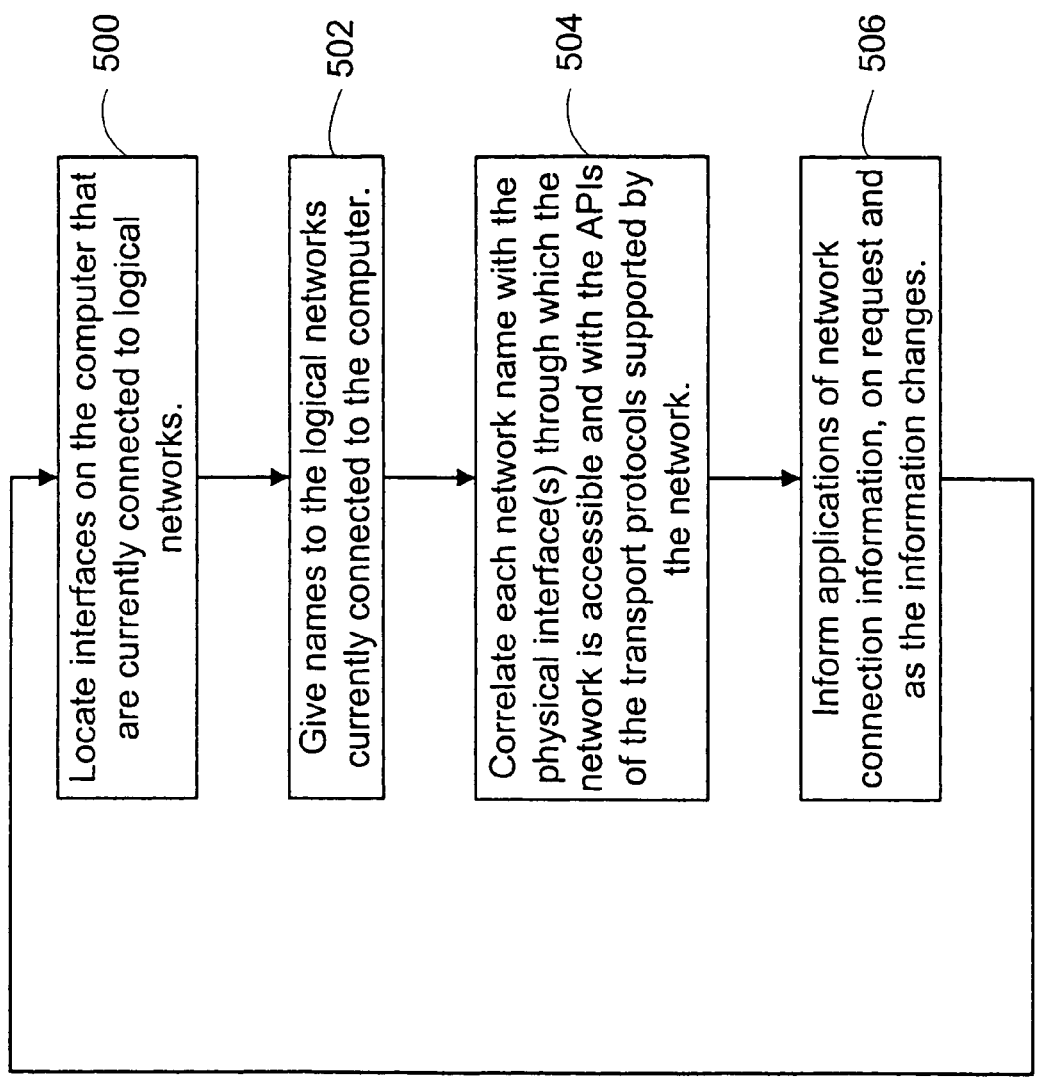
FIG. 5 is a flow diagram showing how one embodiment of the present invention provides network connection information to applications.

FIG. 5 shows the steps followed by one embodiment of the NLRSP invention. In Step 500, the NLRSP contacts the drivers of the network interfaces on the computer to discover which interfaces are currently connected to networks. In some embodiments, the NLRSP simply polls all the network drivers for this information. In other embodiments, the NLRSP registers with the drivers to be automatically notified whenever the driver senses a network connect event.

In step 502 of FIG. 5, the NLRSP constructs names for each logical network connected to the computer. The name given to a logical network is created by the NLRSP in such a manner that the combination of the name and the method through which the name was obtained uniquely identifies the logical network within the context of the computer. The NLRSP also tries to generate names in such a manner that there is a "one-to-one" mapping between the names and the logical networks. This one-to-one mapping has two fundamental properties. First, different logical networks are given different names. Second, a given logical network is given the same name whenever the computer connects to it. These properties are called "uniqueness" and "persistence," respectively. Because the network names are unique and persistent, applications may rely on them when selecting a configuration to use with a given logical network.

In order to try to construct a name that is both unique and persistent, the NLRSP follows a set formula for applying information it discovers about the network. First, the NLRSP searches the logical network for information, and only when it has enough information about the network does it construct a name that applies to no other network (uniqueness). Information used by embodiments of the NLRSP to construct network names includes the domain name of the network (obtainable via DHCP), static information entered by a user to name a network, and subnet addresses. On networks that support the 802.1X authentication protocol, the NLRSP can construct a network name based on the network identity string returned in an EAP Identity Request message. Second, by following a set formula, the NLRSP usually constructs the same name for the same logical network (persistence). Different embodiments of the invention may depend upon different methods for gathering logical network information, and some of these methods may, in certain circumstances, lead to names that violate either the uniqueness or the persistence property of an ideal mapping. The text accompanying FIGS. 9, 10A, and 10B explain some of these situations and show why the information provided by the invention is still useful.

Step 504 of FIG. 5 illustrates that in some embodiments of the present invention, the NLRSP correlates the network name it constructs with other information. A globally unique identifier (GUID) may be given that identifies the computer's physical network interface through which the network is accessible. The GUID can be used by the application when asking for more information about the interface. The network name is also correlated to the APIs of the transport protocols supported by the network. Other information correlated to the network name may include the type of the network interface (e.g., Ethernet or Point-to-Point Protocol), the speed of the network interface, the name of the network access device which supports the network interface, and the port on the network access device through which this connection to the network is made. If the computer has multiple interfaces to the same logical network, then the NLRSP may generate information about each interface, and, while the network name for each interface will be the same, the different interfaces can be distinguished by their GUIDs.

In Step 506 of FIG. 5, the NLRSP presents its information to applications. Applications ask for information and may register to be informed when the information changes. The NLRSP keeps track of the information given to an application and notifies the application whenever any of the information given changes or when new information becomes available.

Figure 6A:
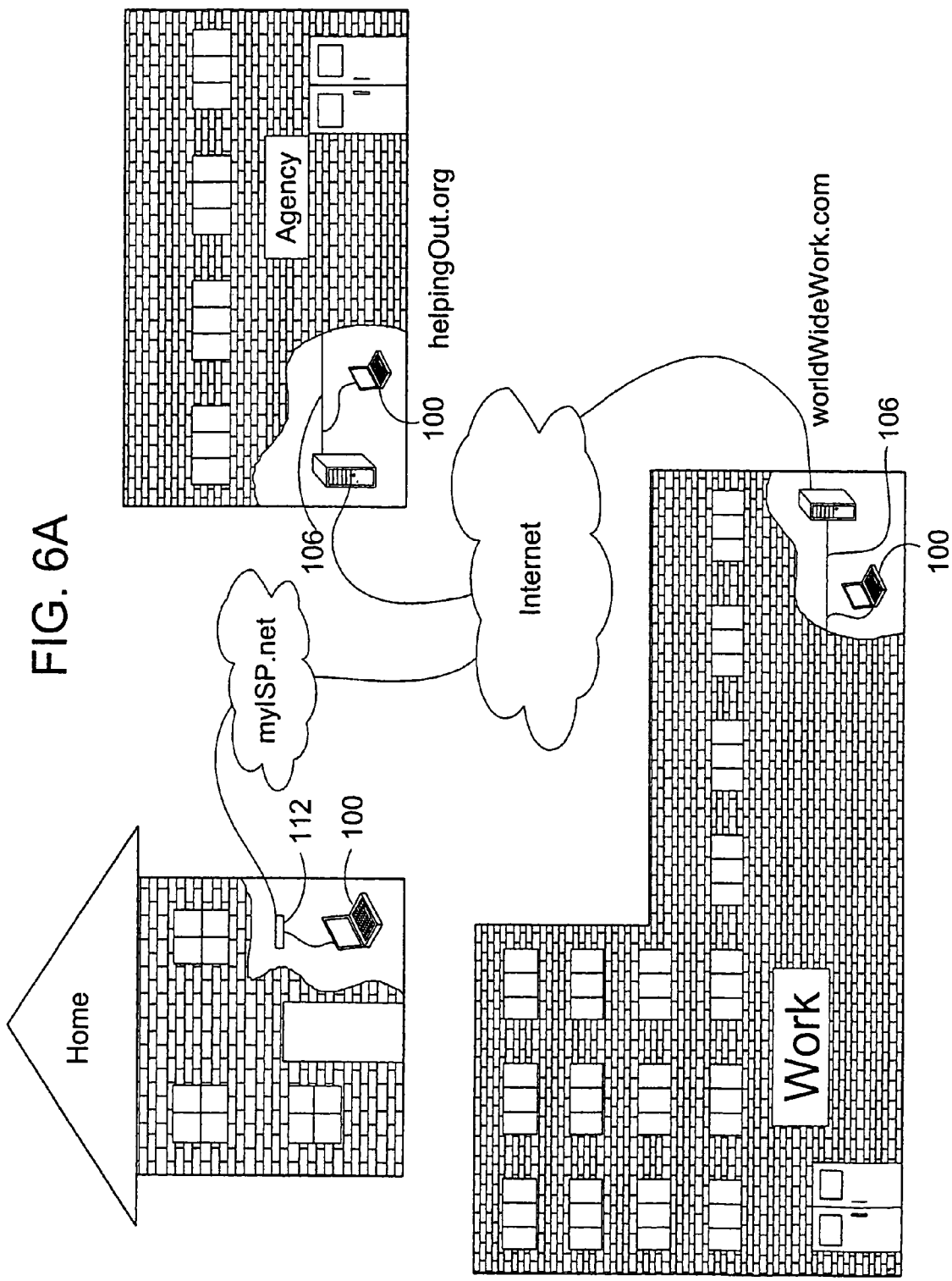
FIG. 6A shows a laptop PC and three locations where the laptop's owner may wish to use it.

FIGS. 6A and 6B illustrate the above points. FIG. 6A shows a laptop PC 100 and three locations where the laptop's owner may wish to use it. In each of the three locations, the user connects the laptop to a logical network and the NLRSP discovers information about the logical network and creates a name for it. When the user is at home, her laptop communicates with the Internet via a dial-up link to a local Internet service provider (ISP). The NLRSP names this logical network "myISP.net." At the user's desk at work, the laptop connects to the corporate LAN 106. The NLRSP queries servers on the LAN and names that logical network "worldWideWork.com." Finally, the user takes her laptop when she volunteers at a local agency. The NLRSP names this logical network "helpingOut.org." It is important to realize that the specific name given by the NLRSP need not be intrinsically descriptive. Applications can rely on the name as long as it is unique and persistent.

FIG. 6B shows, for each of the three locations of FIG. 6A, the network information 600 provided by the NLRSP. The network name 602 created by the NLRSP is discussed in relation to FIG. 6A. The NLRSP identifies the interface 604 through which the logical network can be accessed. Here, that identifier is the GUID of the hardware that supports the computer's physical interface to the logical network. In some embodiments, the NLRSP correlates the network name with other information that applications frequently need. The information provided by the NLRSP in FIG. 6B includes the type of the interface 606 and the nominal speed 608 supported by that interface. If an application needs even more information, it can use the interface identifier 604 to ask for it.

FIG. 6B also shows the configuration a particular application may choose when the laptop 100 is connected to a logical network at a given location. Here, the application uses one configuration 610 for both home and volunteer agency network connections and a separate configuration 612 when at work. The NLRSP does not force the application to use a different configuration for each different network connection; it simply enables the application to do so, at the user's discretion.

Figure 7A:
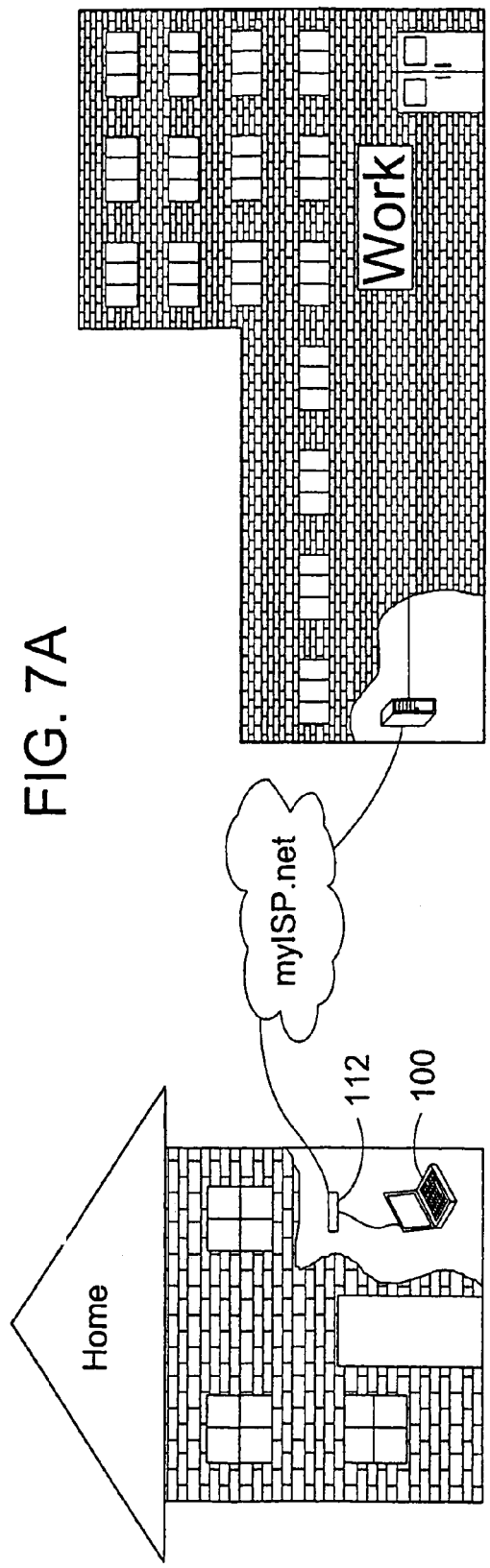
FIGS. 7A and 7B show a virtual private network connection from a user's home to her office and the information provided about this configuration.
Figure 7B:
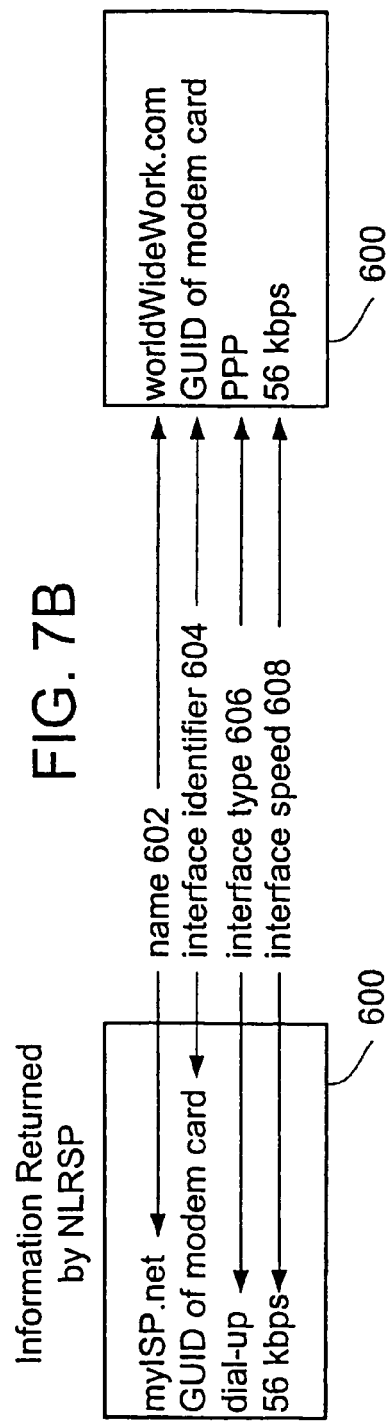

FIGS. 7A and 7B illustrate a complication to the scheme identified above. Here the laptop PC 100 is at the user's home and the NLRSP has named the logical network connection "myISP.net." The user uses that connection to log into work, in the process setting up a virtual private network connection to the network at her work location. In some embodiments of the NLRSP, a second network name is added to the first. The NLRSP creates "worldWideWork.com" to describe a virtual, rather than a physical, network connection. This is shown by the interface type 606 of the new connection, "PPP," which indicates a point-to-point virtual connection. In order to choose the configuration best adapted to this connectivity situation, an application consults both network names created by the NLRSP.

Figures 8A, 8B, 8C:
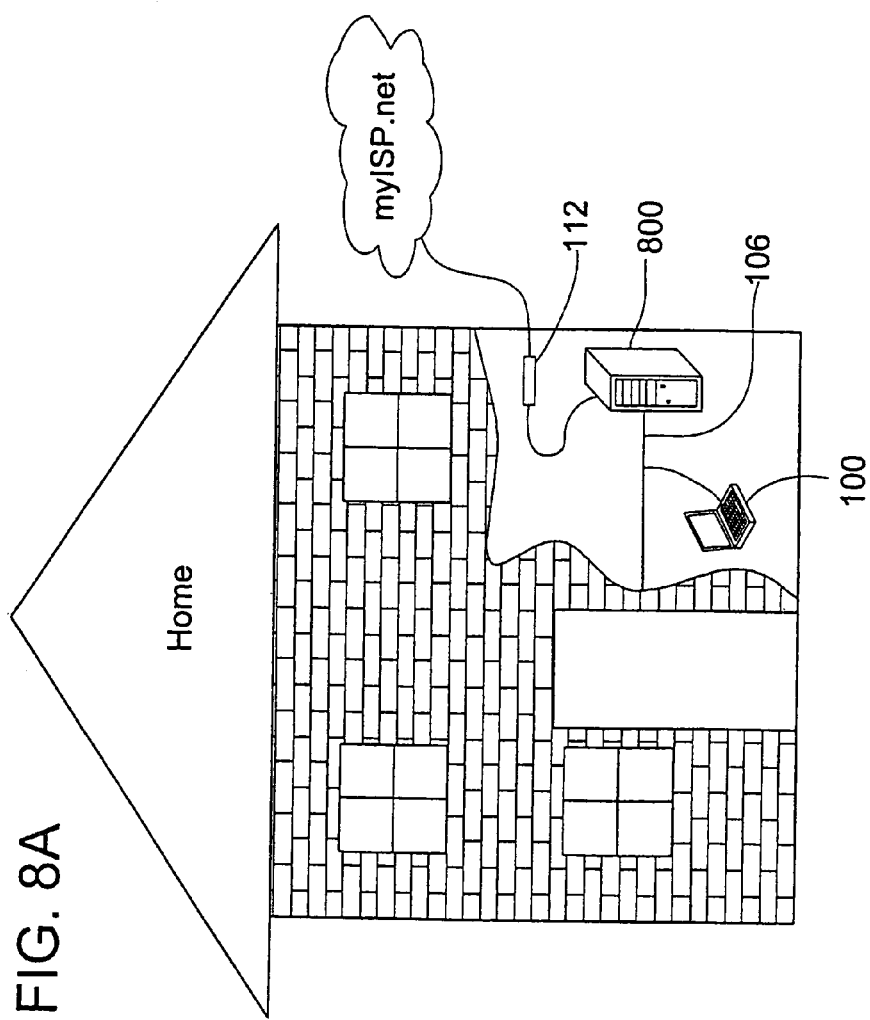
FIGS. 8A through 8C show two computing devices using the Network Address Translator to share a connection to the Internet and the information provided about this configuration.

FIGS. 8A through 8C illustrate a different complication, this one due to the networking technology called Network Address Translator (NAT). NAT allows several computing devices connected in one location to share a single connection to the Internet. In FIG. 8A, the user comes home and sets up a connection to work but she need not dial-up myISP.net as she did in the scenarios of FIGS. 6A and 7A. Instead, she connects the laptop PC 100 to her home LAN 106 and shares the Internet connection already established by the server computing device 800. This is a complication because a straightforward embodiment of the NLRSP running on the laptop might produce the information shown in FIG. 8B. That information, accurate as far as it goes, does not indicate the dial-up connection which is the most likely source of network troubles and bottlenecks. In FIG. 8C, a fuller embodiment of the NLRSP complements the information shown in FIG. 8B with information about the dial-up connection. Applications using the information provided in FIG. 8C can get a more complete picture of the connectivity scenario in which they are working and can respond accordingly.

Figure 9:
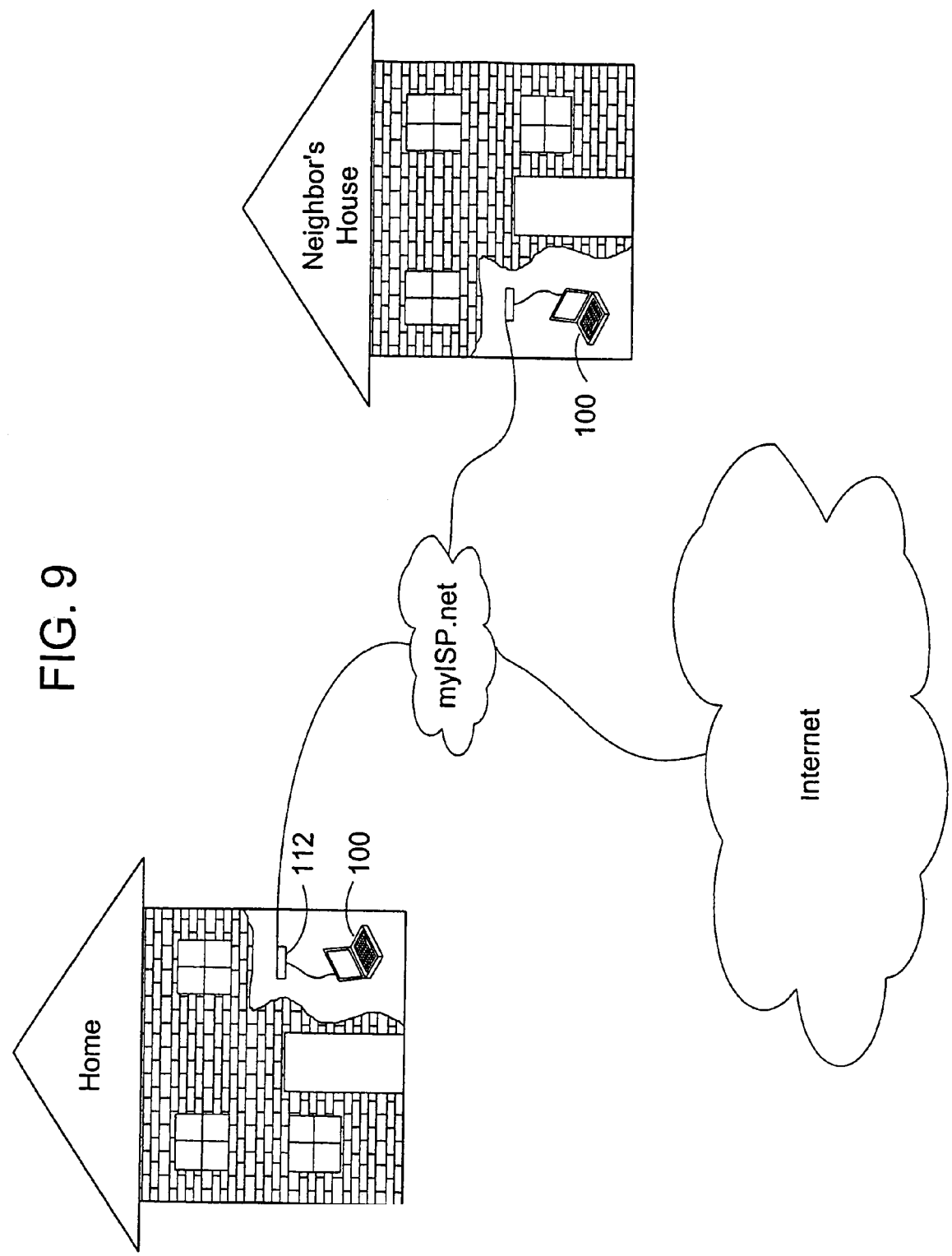
FIG. 9 presents a circumstance in which some embodiments of the invention may return the same name for different networks.

In certain circumstances, it may be very difficult to create a mapping that conforms to the strict requirements of uniqueness and persistence. In FIG. 9, as in FIG. 6A, the ISP provides the same network name to all its dial-in customers. If a user and her neighbor subscribe to the same ISP, then a laptop 100 will report the same network name ("myISP.net") whether it is connected at the user's home or at her neighbor's house. This mapping may violate the uniqueness property because it uses the same network name for connections originating from two different locations. However, this mapping may still be useful in choosing which network configuration to use because the user would most likely want to use the same network configuration when dialing into her ISP regardless of her location when dialing.

In the scenario depicted in FIGS. 10A and 10B, the property of persistence is violated. One night, a system administrator changes the name of the corporate network from "worldWideWork.com" to "captivatingCareer.com." When the user plugs in her laptop 100 at work the next day, the invention maps the corporate network to the name "captivatingCareer.com." The mapping is not persistent because the same network is given different names on different days. Although the laptop has no configuration stored for use with the new name, this problem is easily remedied. The laptop presents the new network name to the user and asks for guidance as to which configuration to use. Realizing what happened, the user directs her laptop to use the configuration once associated with "worldWideWork.com."

Figure 11B:
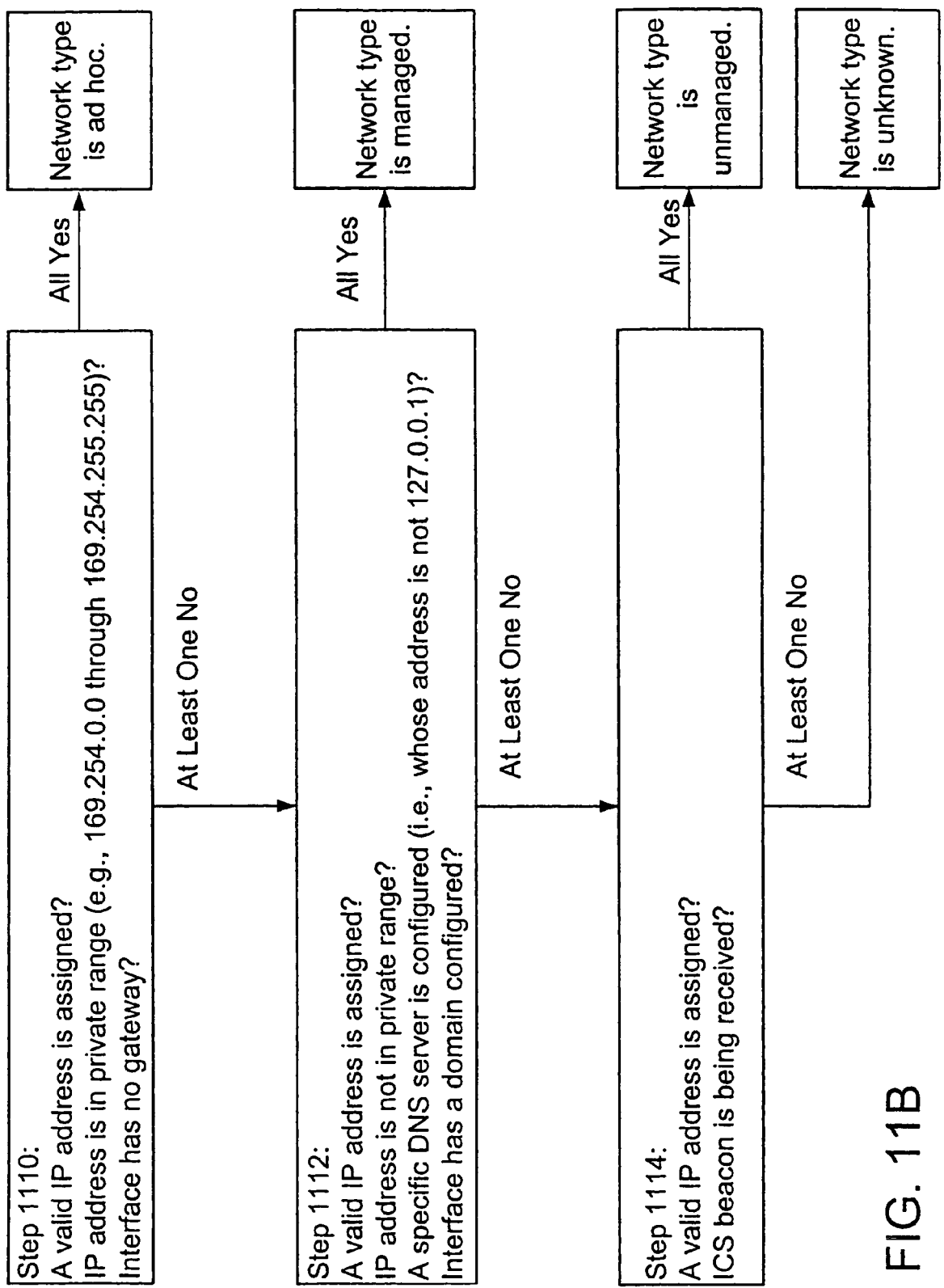
FIG. 11B is a flowchart showing how to determine the connectivity types of the networks of FIG. 11A.

FIGS. 11A, 11B, 11C, and 11D illustrate another type of information gathered by the NLRSP about the networks connected to the host computer. This information relates primarily to the other devices connected to the network. A network may be of one of four "connectivity types" and FIG. 11A is a network diagram showing a computing device 100 connected to four different types of networks. (It is unlikely that one device would be connected to one network of each connectivity type, but it is not impossible, and this configuration is useful for illustrative purposes.) The NLRSP probes the networks for information and uses an algorithm such as the one portrayed in FIG. 11B to determine the connectivity type of each network. The specifics of the FIG. 11B algorithm are pertinent to the IP protocol, but the general method is widely applicable. Network 1100 is called an "ad hoc" network, defined to be a network not connected to any other network. The NLRSP determines this in step 1110 by noting that the host computing device's address on this network is in the private IP address range 169.254.0.0 through 169.254.255.255 and by noting that there is no gateway on the network. Network 1102 is a "managed" network, determined in step 1112 by the host 100 having a valid address (not 0.0.0.0) not in the private domain range of an ad hoc network, the presence in the host's configuration for this network connection of a DNS server with address other than 127.0.0.1, and the host having a domain configured. The NLRSP contacts the DNS server 1108 to see that it exists. Network 1104 is called "unmanaged" because it is on the private side of a NAT server 800. (For a description of NAT, see the text accompanying FIG. 8A). The NLRSP determines that this is an unmanaged network in step 1114 because it receives an Internet Connection Service (ICS) beacon periodically broadcast by the NAT server. (As a practical matter, it may take so long to detect the beacon that the NLRSP returns the connectivity type before detecting it.) Finally, network 1106 is of connectivity type "unknown" because the NLRSP's tests in steps 1110, 1112, and 1114 are not determinative of any of the three previous network types. A declaration of type "unknown" also results whenever the interface is not connected to a network because this algorithm depends upon information gathered from the network. When the interface becomes connected to a network, the algorithm is re-run to determine the connectivity type of the new connection.

Figure 11C:
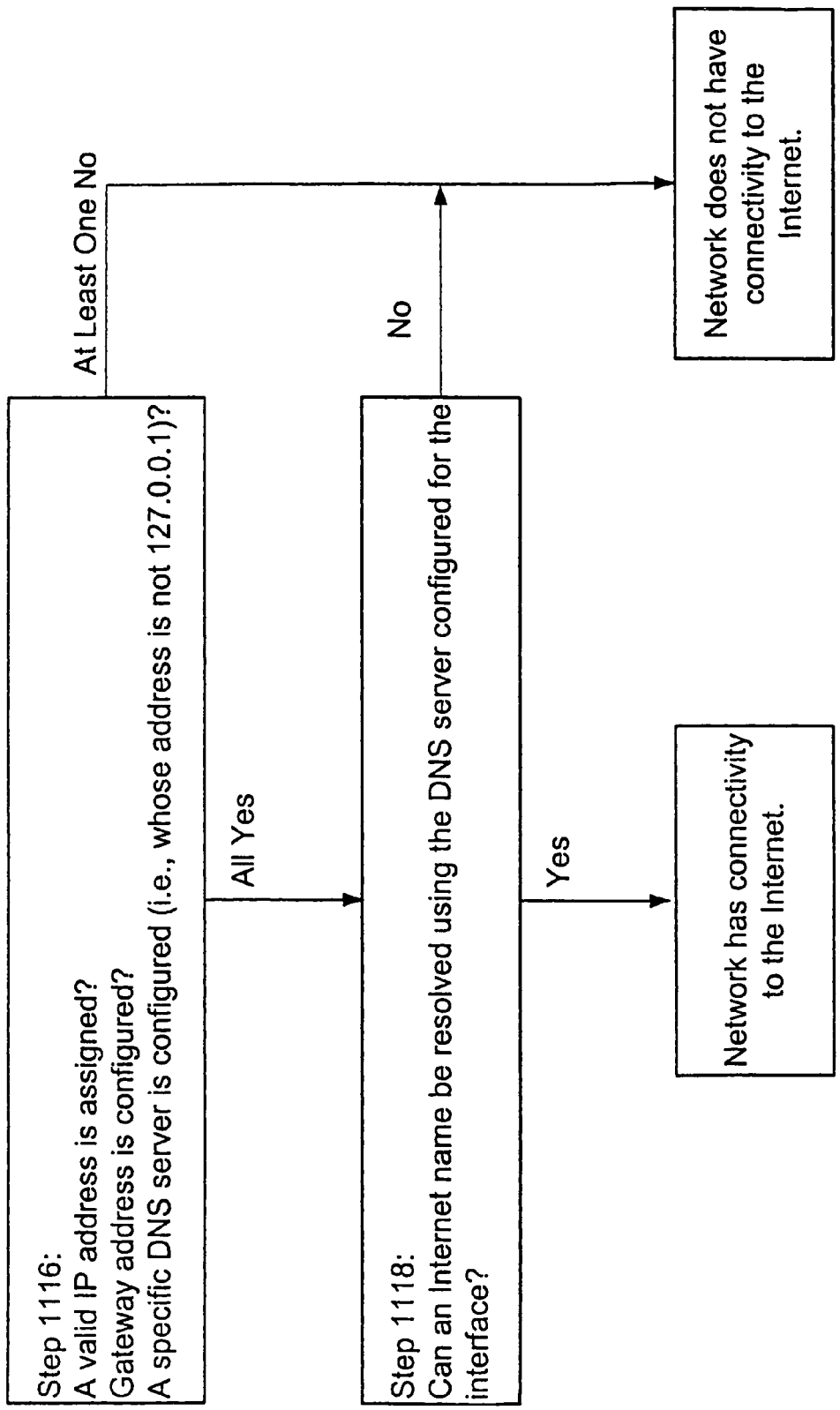
FIG. 11C is a flowchart showing how to determine whether a network has connectivity to the Internet.

In addition to determining the connectivity type of the networks, the NLRSP checks to see if each network provides connectivity to the Internet. FIG. 11C shows how this may be accomplished. In step 1116, the NLRSP checks some preliminary information. Then, in step 1118, the NLRSP tries to resolve an Internet name. The particular name used is of little importance. If the name is resolved, then the network has connectivity to the Internet.

FIG. 11D is a block diagram showing network connectivity type and Internet connectivity information for the four networks of FIG. 11A. Note that by definition a network with connectivity type "ad hoc" does not have Internet connectivity. The network connectivity type and Internet connectivity information are returned for each network as optional fields added on to the block 600, first shown in FIG. 6B.

In some circumstances, domain administrators need to set up group policies to tailor network usage. These policies are preferably based on connectivity information presented by the NLRSP. For example, an ICS group policy may allow users to enable and run ICS at home but prohibit them from using ICS if the NLRSP detects that the computer is connected to a corporate network. Similarly, for safety's sake, a user may run a firewall application to guard the computer's network links if the user is at home or on the road. However, that firewall application becomes merely a nuisance if it is run on links to a network already protected by a dedicated firewall, such as a corporate network. The group policy may disable the firewall for those links, and only for those links, connected to the corporate network. Many other scenarios can be imagined where group policies are based on knowing the specific networks to which a computer is connected.

VI. An NLRSP API According to One Aspect of the Invention

This section details one embodiment of the present invention, directed toward Microsoft's "WINDOWS" operating system. In this embodiment, the invention is presented as an API that allows applications to enumerate all of the logical networks currently accessible from the application's host computer, to identify the name given to a logical network, and to identify the transport address of the physical network interface to a logical network. In addition, the WSANSPIoctl function is used to notify applications when information previously provided to them changes.

WSANSPIoctl

The Windows Sockets WSANSPIoctl function provides a method for making Input/Output control calls to a registered namespace. It has the following structure:

```
INT WSAPI WSANSPIoctl
(
    HANDLE          hLookup,
    DWORD           dwControlCode,
    PVOID           pvInBuffer,
    PD WORD         pcbInBuffer,
    PVOID           pvOutBuffer,
    PDWORD          pcbOutBuffer,
    PWSACOMPLETION  pCompletion
);
```

Parameters:
hLookup
[in] Lookup handle returned from a call to WSALookupServiceBegin.
dwControlCode
[in] The control code of the operation to perform.
pvInBuffer
[in] A pointer to the input buffer for the operation.
cbInBuffer
[in/out] The size of the input buffer for the operation.
pvOutBuffer
[out] A pointer to the output buffer for the operation.
pcbOutBuffer
[in/out] A pointer to an integral value for the size of the output buffer.
pCompletion
[in] A pointer to a WSACOMPLETION structure.

Return Value:
Upon successful completion, WSANSPIoctl returns NO_ERROR. Otherwise, a value of SOCKET_ERROR is returned, and a specific error code can be retrieved by calling WSAGetLastError.

Error Codes:
WSANOTINITIALISED
A successful call to NSPStartup was not performed.
WSA_INVALID_HANDLE
hLookup was not a valid query handle returned by WSALookupServiceBegin, or a handle passed in pCompletion was invalid.
WSAEFAULT
The pvInBuffer, pcbInBuffer, pvOutBuffer, pcbOutBuffer, or pCompletion argument is not totally contained in a valid part of the user address space. Alternatively, the cbInBuffer or cbOutBuffer argument is too small, and the argument is modified to reflect the required allocation size.
WSAEOPNOTSUPP
The specified dwControlCode is unrecognized.
WSAEINVAL
A supplied parameter is not acceptable, or the operation inappropriately returns results from multiple namespaces when it does not make sense for the specified operation.
WSA_NOT_ENOUGH_MEMORY
There were insufficient resources to perform the requested operation.
WSAEWOULDBLOCK
A non-blocking (polling) request was issued and the desired condition was unsatisfied. If dwControlCode was set to SIO_NSP_NOTIFY_CHANGE, a polling change-notification request was made and nothing about the resulting data has changed.
WSA_OPERATION_ABORTED
A blocking request was unable to complete.
WSASYSCALLFAILURE
An APC completion was indicated in pCompletion and the operation completed immediately, but the system failed to queue a thread to complete the APC.

Remarks:
The WSANSPIoctl function is used to set or retrieve operating parameters associated with a namespace query handle.

Any IOCTL may block indefinitely, depending upon the relevant namespace's implementation. If an application cannot tolerate blocking in a WSANSPIoctl call, it uses overlapped Input/Output. For these operations, which cannot be completed immediately, completion is indicated later through the mechanism specified in the pCompletion parameter, which is a pointer to a WSACOMPLETION structure. If pCompletion is NULL, this is a blocking call. To make this call non-blocking and return immediately, set WSACOMPLETION::Type to LUP_NOTIFY_IMMEDIATELY.

```
WSACOMPLETION
    typedef struct_wsacompletion
    {
```

-continued

```
    enum_type
    {
        LUP_NOTIFY_IMMEDIATELY,
        LUP_NOTIFY_HWND,
        LUP_NOTIFY_EVENT,
        LUP_NOTIFY_PORT,
        LUP_NOTIFY_APC
    }Type;
    PVOID              Recipient;
    UINT_PTR           Completion;
    PWSAOVERLAPPED     Overlapped;
}
```

Members:

Type

Indicates the type of Recipient.

Recipient

Either an HWND, HANDLE to an event or completion port, or function address for an asynchronous procedure call.

Completion

For Type LUP_NOTIFY_HWND, this is the window message identifier to send. For Type LUP_NOTIFY_PORT, this is the completion key to use.

Overlapped

Used in overlapped operations.

The following IOCTL code (command) is supported by NLA: SIO_NSP_NOTIFY_CHANGE

This operation checks if the query results returned via calls to WSALookupServiceBegin and WSALookupServiceNext remain valid. If pCompletion is NULL, this operation is a poll and returns immediately. If the query set remains valid, WSAEWOULDBLOCK is returned to indicate that later invalidation will require an asynchronous notification. If the query set has changed and is invalid, NO_ERROR is returned indicating success in polling for invalidation of the query set. Not all name resolution protocols will be able to support this feature and thus this call may fail with WSAEOPNOTSUPP. A query containing data from multiple providers cannot call this IOCTL and will return WSAEINVAL.

pvInBuffer, pcbInBuffer, pvOutBuffer, and pcbOutBuffer are ignored.

Some protocols may simply cache the information locally and invalidate it after some time, in which case a notification is issued to indicate that the local cache has been invalidated.

For name resolution protocols where changes are infrequent, it is possible for a namespace service provider to indicate a global change event that may not be applicable to the query on which change notification was requested and issued.

Immediate poll operations are usually much less expensive because they do not require a notification object. In most cases, this is implemented as a simple Boolean variable check. Asynchronous notification, on the other hand, in addition to expenses related to the notification object involved with signaling the change event, may (depending on the implementation of the namespace service provider) necessitate the creation of dedicated worker threads or inter-process communication channels.

To cancel an asynchronous notification request, simply end the original query with a WSALookupServiceEnd call on the affected query handle. Canceling asynchronous notification for LUP_NOTIFY_HWND will not post any message, however an overlapped operation will be completed, and notification will be delivered with the error WSA_OPERATION_ABORTED.

Upon signaling an invalidation of query data, a namespace should permit, through extended semantics of WSALookupServiceNext, an application to query what about the data has changed.

Queries

Queries are performed using the following namespace calls. NSPLookupServiceBegin The returned lphHandle for the query is an internal LPNLA_QUERY_HANDLE structure allocated on a private heap for the namespace. It is treated as an opaque object by the application and not modified. It is not a true handle so WSAGetOverlappedResult cannot be used. The resulting query set comprises the adapter enumeration from GetAdaptersInfo and a registry-merge of non-active, saved network names. Registry-merge is the process of obtaining user-specific, persistent network names from HKEY_CURRENT_USER, combining the resulting list with global-system, persistent network names from HKEY_LOCAL_MACHINE, matching or adding them as appropriate to the adapter enumeration list, and producing a list of WSAQUERYSETW structures.

LUP_RETURN_NAME, LUP_RETURN_COMMENT, LUP_DEEP, and LUP_RETURN_BLOB may be set in dwControlFlags. These affect the output from future calls to NSPLookupServiceNext. Future calls only return the networks that contain the requested fields. For example, if LUP_RETURN_BLOB is requested, then only those networks with blob (binary large object) information will be returned from calls to NSPLookupServiceNext regardless of which controls flags are passed in. When LUP_DEEP is specified, NLA returns extended network information which may take a long time to acquire.

Error Codes:

WSANOTINITIALISED

A successful call to NSPStartup was not performed.

WSASERVICE_NOT_FOUND lpProviderId or lpqsRestrictions->lpServiceClassId was an invalid GUID.

WSAEINVAL

A parameter was not validated, or lpqsRestrictions->lpafpProtocols contains something other than IP-based protocols, or dwControlFlags contains an invalid flag. Alternatively, network or friendly name filtering was indicated by lpqsRestrictions->lpszServiceInstanceName, or there was a non-NULL lpqsRestrictions->lpszComment, and LUP_RETURN_NAME or LUP_RETURN_COMMENT was not specified in dwControlFlags, respectively.

WSANO_DATA

LUP_CONTAINERS was specified in dwControlFlags.

WSAEFAULT

An access violation occurred while reading from or writing to user-supplied parameters.

WSA_NOT_ENOUGH_MEMORY

The system was unable to allocate a query handle or share memory from a system service.

WSAEACCESS

The calling thread lacked security permissions to access the user-persistent networks.

WSAESYSNOTREADY

The NLA system service was not available.

NSPLookupServiceNext

First, the lphHandle is checked to see that it is a true handle returned by NSPLookupServiceBegin. If valid, a new WSAQUERYSETW is copied into lpqsResults. If LUP_RETURN_BLOB was specified and various information about the networks exists, the information is returned in lpqsResults->lpBlob. Pointers in the view of the mapped file are offset relative to the beginning of each individual WSAQUERYSETW. These are changed to actual addresses in the namespace's process address space before being returned from this call. The resulting WSAQUERYSETW is formatted as follows.

LUP_RETURN_NAME, LUP_RETURN_COMMENT, and LUP_RETURN_BLOB may be set in dwControlFlags. These are independent of those supported in NSPLookupServiceBegin.

Upon receiving a WSA_E_NO_MORE from a WSALookupServiceNext call, if WSANSPIoctl was called with SIO_NSP_NOTIFY_CHANGE which succeeded immediately or returned pending, then WSALookupServiceNext may be called again to enumerate those networks that have changed. dwOutputFlags will contain one of the following:
RESULT_IS_ADDED
RESULT_IS_CHANGED
RESULT_IS_DELETED A change can be indicated when any field which was requested at the time of WSALookupServiceBegin changes in any way.

When the enumeration completes, WSA_E_NO_MORE is received. A SIO_NSP_NOTIFY_CHANGE may be reissued at any time.

Error Codes:
WSANOTINITIALISED
A successful call to NSPStartup was not performed.
WSAEINVAL
lpdwBufferLength was NULL, dwControlFlags has an invalid value, or LUP_FLUSHPREVIOUS was specified when there was nothing to flush.
WSA_INVALID_HANDLE
hLookup is not a valid query handle returned by NSPLookupServiceBegin.
WSAESYSNOTAVAIL
The NLA system service is not available.
WSAEACCESS
The calling thread lacked security permissions to access the user-persistent networks.
WSAEFAULT
lpdwBufferLength indicated a buffer in lpqsResults too small to hold the resulting WSAQUERYSETW. The size required is returned in lpdwBufferLength. If the application is unable to supply a buffer of the specified size, it calls WSALookupServiceNext with dwControlFlags set to LUP_FLUSHPREVIOUS to skip over the entry. Alternatively, an access violation occurred while writing data to the buffer supplied in lpqsResults.
WSA_NOT_ENOUGH_MEMORY
The namespace is unable to acquire network information from the NLA system service due to a lack of memory in the calling process.
WSA_E_NO_MORE
No more networks are left to enumerate in the query result.
WSAESYSNOTREADY
The NLA system service is not available.

NSPLookupServiceEnd

The lookup handle is deallocated from the namespace private heap, and if the reference count hits zero, the LPC connection to the service is closed.

Error Codes:
WSANOTINITIALISED
A successful call to NSPStartup was not performed.
WSA_INVALID_HANDLE
hLookup was not a valid query handle returned by NSPLookupServiceBegin.

NLA_BLOB

When LUP_RETURN_BLOB is specified for a given query, NLA attaches relevant NLA_BLOB entries to the resultant data in calls to NSPLookupServiceNext via (PNLA_BLOB)lpqsResults->lpBlob->pBlobData with the following format:

```
typedef enum _NLA_BLOB_DATA_TYPE
{
    NLA_RAW_DATA            = 0,
    NLA_INTERFACE           = 1,
    NLA_802_1X_LOCATION     = 2,
    NLA_CONNECTIVITY        = 3,    // LUP_DEEP
                                    required.
    NLA_ICS                 = 4,    // LUP_DEEP
                                    required.
} NLA_BLOB_DATA_TYPE, *PNLA_BLOB_DATA_TYPE;
typedef enum _NLA_CONNECTIVITY_TYPE
{
    NLA_NETWORK_AD_HOC      = 0,
    NLA_NETWORK_MANAGED     = 1,
    NLA_NETWORK_UNMANAGED   = 2,
    NLA_NETWORK_UNKNOWN     = 3,
} NLA_CONNECTIVITY_TYPE *PNLA_CONNECTIVITY_TYPE;
typedef enum _NLA_INTERNET
{
    NLA_INTERNET_UNKNOWN    = 0,
    NLA_INTERNET_NO         = 1,
    NLA_INTERNET_YES        = 2,
} NLA_INTERNET, *PNLA_INTERNET;
typedef struct _NLA_BLOB
{
    struct
    {
        NLA_BLOB_DATA_TYPE      type;
        DWORD                   dwSize;
        DWORD                   nextOffset;
    } header;
    union
    {
        // header.type -> NLA_RAW_DATA
        CHAR                    rawData[1];
        //header.type -> NLA_INTERFACE
        struct
        {
            DWORD               dwType;
            DWORD               dwSpeed;
            CHAR                adapterName[1];
        } interfaceData;
        //header.type -> NLA_802_1X_LOCATION
        struct
        {
            CHAR                information[1];
        } locationData;
        //header.type -> NLA_CONNECTIVITY
        struct
        {
            NLA_CONNECTIVITY_TYPE   type;
            NLA_INTERNET            internet;
        } connectivity;
        //header.type -> NLA_ICS
        struct
        {
            struct
```

```
        -continued
{
    DWORD           speed;
    DWORD           type;
    DWORD           state;
    WCHAR           machineName[256];
    WCHAR           sharedAdapterName[256];
  } remote;
 } ICS;
} data;
} NLA_BLOB, *PNLA_BLOB, *FAR LPNLA_BLOB;
```

Notification Mechanism

To eliminate the need for worker threads in the namespace dynamic library to wait upon change notification events and then translate them into the user-requested notification type, an NLA system service, running as localsystem under svchost.exe, is used. This also minimizes the number of recipients of change events to a single process for the entire system which then filters out the events only to the processes that are interested in such changes.

Upon system startup, the NLA service starts an LPC server port in a worker thread. It then blocks waiting for connection and notification-change registrations from a process using the namespace. When a new connection is registered, a FILE_MAP_READ file mapping handle is given to the calling client, and an LPC request is issued to obtain the network data separately.

When WSANSPIoctl is invoked upon a valid query handle with the operation SIO_NSP_NOTIFY_CHANGE, the service is given a duplicate of the query's registry key handle, and a change notification request is registered via the LPC connection. When the DHCP service signals in the service's main thread, the service reconstructs the file mapping, performs all client change-notifications, and clears the registration list. If a particular user registry key updates, that particular registration is notified and removed from the registration list. If an LPC connection is broken, the service removes that application's query sets from the registration set.

Superfluous notifications are permissible.

Network Persistence and Friendly Names

The mapping method maintains its quality of persistence even through the period during which a network is not active. That is to say, a network is given the same name whether or not that network is currently active. This property allows an application to configure to an inactive network, waiting for the network to become active.

NSPSetService

Parameters:

lpqsRegInfo

This WSAQUERYSETW is either from a query result or is manually constructed.

essOperation

Supported Operations:

RNRSERVICE_REGISTER

The supplied network WSAQUERYSETW from lpqsRegInfo is made persistent in the fashion indicated by dwControlFlags.

RNRSERVICE_DELETE

If the supplied network WSAQUERYSETW from lpqsRegInfo is persistent, then it will be removed.

dwControlFlags

The operation performs an essOperation with either or both of the following options:

NLA_FRIENDLY_NAME

The lpszComment field of the supplied network WSAQUERYSETW from lpqsRegInfo is valid and will be stored persistently. This cannot be specified with RNRSERVICE_DELETE, instead use RNRSERVICE_REGISTER with a NULL-terminated string to clear a friendly name.

NLA_ALLUSERS_NETWORK

The entry is stored persistently under HKEY_LOCAL_MACHINE, making it available during queries to all users on the local machine. To delete a network from under HKEY_CURRENT_USER, this flag must not be specified. This flag is only valid in the security context of a local system administrator.

Error Codes:

WSANOTINITIALISED

A successful call to NSPStartup was not performed.

WSASERVICE_NOT_FOUND lpProviderId indicated an invalid provider, or lpqsRegInfo->lpServiceClassId indicated a service not provided by this namespace.

WSAEINVAL essOperation or lpqsRegInfo was invalid. The network name may be missing in lpqsRegInfo->lpszServiceInstanceName, or a friendly name may be missing in lpqsRegInfo->lpszComment when NLA_FRIENDLY_NAME is specified in dwControlFlags or when lpqsRegInfo->lpVersion, lpqsRegInfo->lpBlob, lpqsRegInfo->lpszContext, or lpqsRegInfo->lpcsaBuffer is non-NULL. Also, this error can be returned when RNRSERVICE_DELETE is requested in essOperation while specifying NLA_FRIENDLY_NAME in dwControlFlags. To clear a friendly name, use RNRSERVICE_REGISTER with a NULL-terminated string for the friendly name.

WSAEFAULT

An access-violation occurred while examining the supplied parameters.

WSAEACCESS

NLA_ALLUSERS_NETWORK was specified in dwControlFlags while not in the security context of a local system administrator, or the calling thread lacked the access to store the information for the current user, or RNRSERVICE_DELETE was specified for a persistent network which did not exist.

Application Termination

Because LPC is used, cleanup is simple as the NLA service will be notified of port closure.

The embodiments described above are illustrative only and are not intended to limit the scope of the present invention. In particular, the embodiments describe the invention with respect to TCP/IP networking technologies and with respect to Microsoft "WINDOWS" operating systems but the invention applies as well to other networking technologies and to other computer technologies. The invention applies to all networks, to wireless as well as to wired network technologies. Therefore, the invention as described herein contemplates all such embodiments as may come within the scope of the following claims and equivalents thereof.

We claim:

1. A method for providing network connectivity information to an application running on a computing device, the method comprising:

gaining connectivity to a network;
discovering aspects of the network;
associating a first name with the network, the first name unique within the context of the computing device;
providing the first name to the application as a key for accessing the discovered aspects of the network;
losing connectivity to the network;
regaining connectivity to the network;
rediscovering aspects of the network;
associating a second name with the network, wherein the second name is the same as the first name; and
correlating the first name with application programming interfaces of transport protocols supported by the network for identifying the computer's logical network attachments.

* * * * *